United States Patent
Maetaki

(10) Patent No.: US 9,645,370 B2
(45) Date of Patent: May 9, 2017

(54) ZOOM LENS AND IMAGE PICKUP APPARATUS HAVING THE SAME

(71) Applicant: CANON KABUSHIKI KAISHA, Tokyo (JP)

(72) Inventor: Satoshi Maetaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/165,215

(22) Filed: May 26, 2016

(65) Prior Publication Data

US 2016/0349492 A1    Dec. 1, 2016

(30) Foreign Application Priority Data

May 28, 2015    (JP) .................................. 2015-108317

(51) Int. Cl.
*G02B 15/22* (2006.01)
(52) U.S. Cl.
CPC .................... *G02B 15/22* (2013.01)
(58) Field of Classification Search
CPC ...... G02B 15/22; G02B 13/0045; G02B 9/62; G02B 9/64; G02B 9/60; G02B 9/34
See application file for complete search history.

(56) References Cited

U.S. PATENT DOCUMENTS

| | | |
|---|---|---|
| 8,982,476 B2 | 3/2015 | Maetaki |
| 2009/0067060 A1* | 3/2009 | Sudoh .................. G02B 15/177 359/683 |
| 2014/0098253 A1 | 4/2014 | Maetaki |
| 2015/0234166 A1 | 8/2015 | Maetaki |

FOREIGN PATENT DOCUMENTS

| | | |
|---|---|---|
| JP | 2003-295060 A | 10/2003 |
| JP | 2009-251114 A | 10/2009 |
| JP | 2012-247687 A | 12/2012 |

* cited by examiner

*Primary Examiner* — Joseph P Martinez
(74) *Attorney, Agent, or Firm* — Carter, DeLuca, Farrell & Schmidt, LLP

(57) ABSTRACT

A zoom lens has a first positive lens unit having a positive refractive power, a second positive lens unit arranged adjacent to the first positive lens unit on its image side, a third positive lens unit arranged adjacent to the second positive lens unit on its image side, and a front lens group arranged on the object side of the first positive lens unit. Appropriate conditions concerning the refractive power of the front lens group, the focal length of the second positive lens unit, and the focal length of the zoom lens at the wide angle end are given.

14 Claims, 16 Drawing Sheets

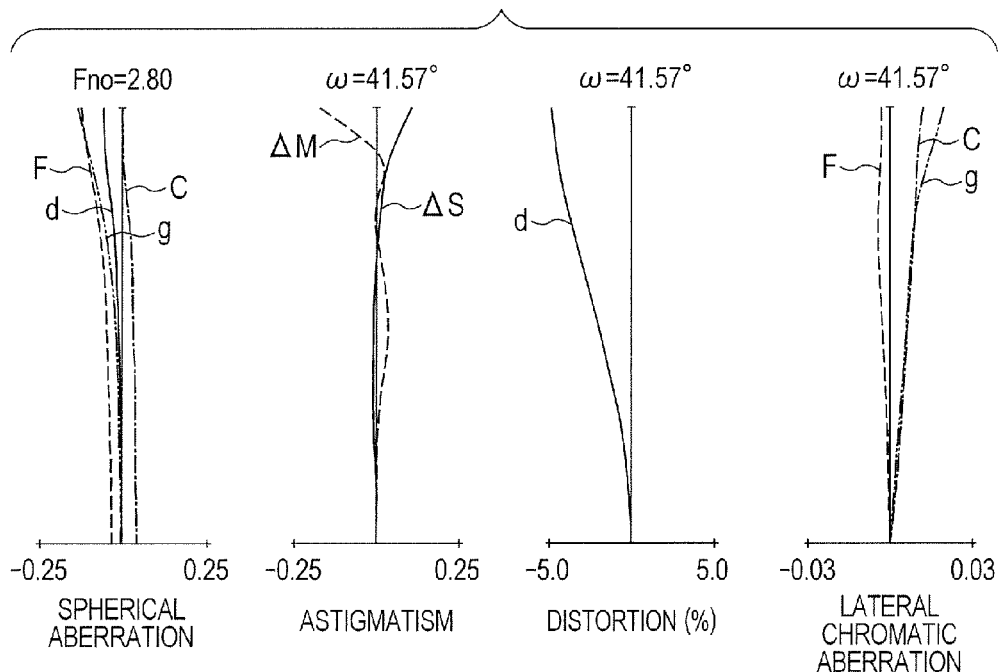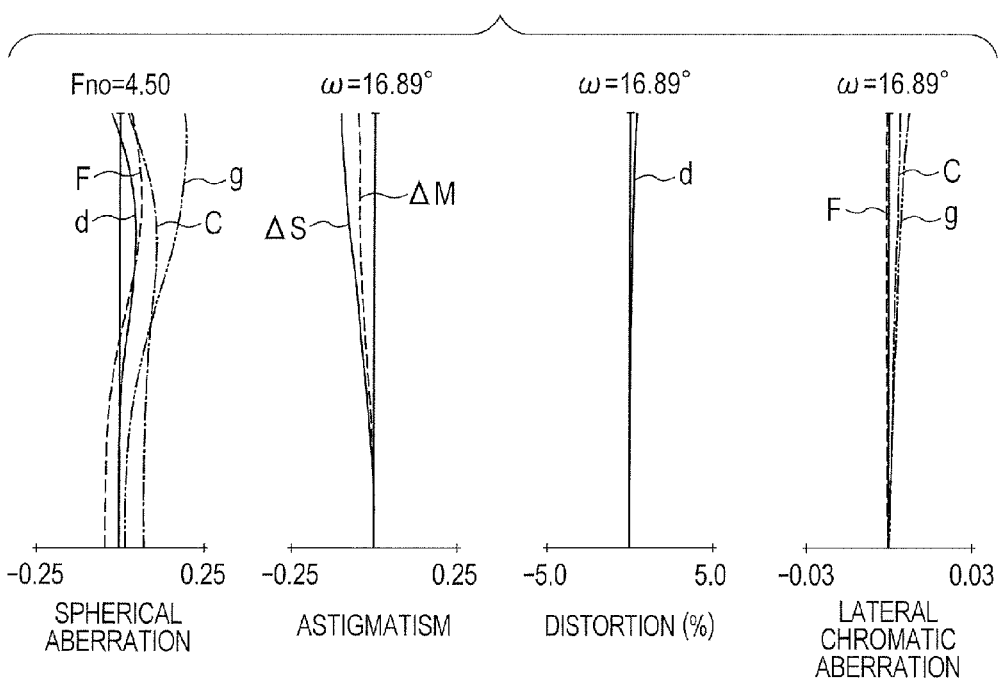

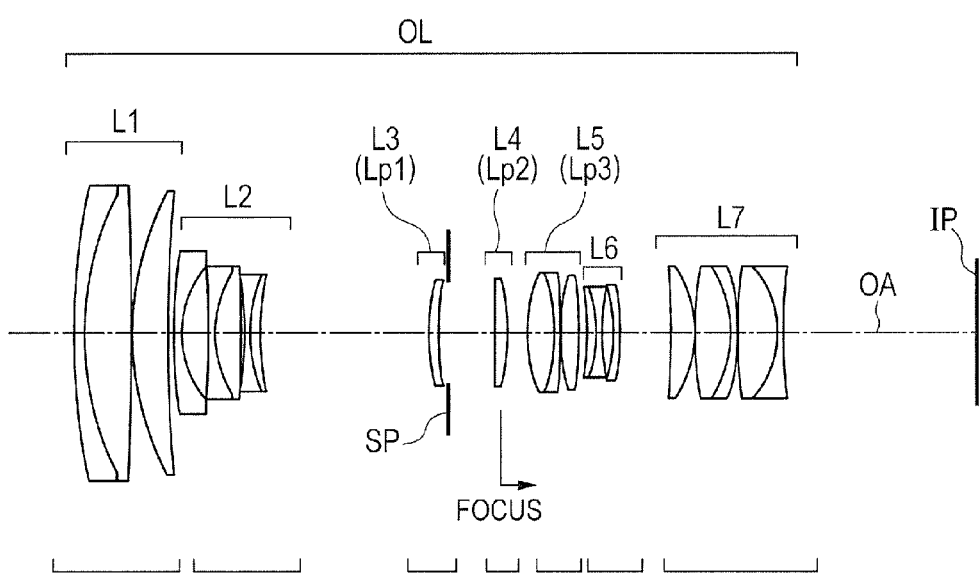
FIG. 10
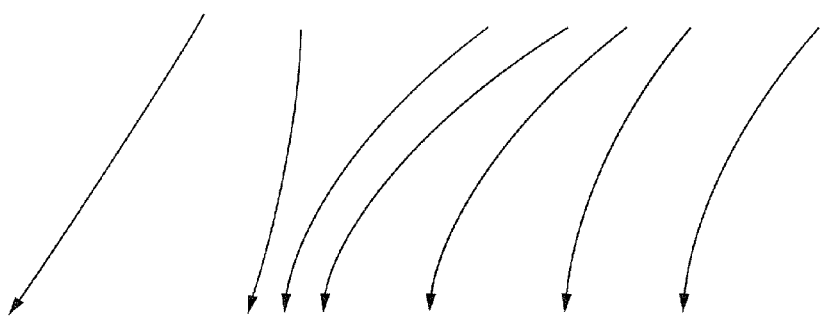

ZOOM LENS AND IMAGE PICKUP APPARATUS HAVING THE SAME

BACKGROUND OF THE INVENTION

Field of the Invention

The present invention relates to a zoom lens and an image pickup apparatus having the same. The present invention is suitably applicable to image pickup optical systems used in, for example, digital still cameras, digital video cameras, TV cameras, and surveillance cameras.

Description of the Related Art

Image pickup optical systems used in image pickup apparatuses are demanded to have excellent optical performance throughout the entire object distance range from infinity to the closest distance. Moreover, they are demanded to be capable of performing focusing at high speed and high accuracy. Especially when performing auto focusing, high focusing speed is demanded.

Image pickup apparatuses such as single lens reflex cameras in nowadays are demanded to have video shooting function and to be capable of auto-focusing during video shooting. As the method of auto-focusing during video shooting, contrast AF (TV-AF) method is widely-employed. In this method, the in-focus state of an image pickup optical system is evaluated by detecting change in the contrast in the picked-up image signal.

In the TV-AF method, an image signal picked up while the focus lens unit is oscillated at high speed along the direction of the optical system is used. In the case where the TV-AF method is employed, it is necessary that the focus lens unit be small and light-weight so that the focus lens unit can be driven at high speed with low load on the driving device (or actuator) that drives the focus lens unit to keep quietness. There have been developed zoom lenses that perform focusing by shifting a lens unit that is relatively small and light-weight among the lens units in them.

Japanese Patent Application Laid-Open No. 2003-295060 discloses a zoom lens that has first to fourth lens units respectively having positive, negative, positive, and positive refractive powers in order from the object side and performs focusing by shifting the second lens unit or the first and second lens units along the direction of the optical axis. Japanese Patent Application Laid-Open No. 2009-251114 discloses a zoom lens that has first to fifth lens units respectively having positive, negative, positive, positive, and positive refractive powers in order from the object side to the image side and performs focusing by shifting the third lens unit.

Japanese Patent Application Laid-Open No. 2012-247687 discloses a zoom lens that has first to fourth lens units respectively having negative, positive, negative, and positive refractive powers in order from the object side and performs focusing by shifting the second lens unit along the direction of the optical axis.

To provide a zoom lens that is small in size, having excellent optical performance throughout the entire object distance range, and capable of performing focusing at high speed, it is important to select the zoom lens type, the number of focus lens units, and conditions in shifting the focus lens units appropriately. In particular, it is important to design the refractive power of the lens units arranged on the object side and the image side of the focus lens units and the configuration of the focus lens units appropriately.

If the design of the above-mentioned factors is inappropriate, it is difficult to provide a zoom lens having a desired zoom ratio and having excellent optical performance throughout the entire object distance range from infinity to the closest distance while achieving size reduction of the zoom lens. For example, if the focusing is performed by shifting a lens unit that is most contributive to the magnification variation of the zoom lens, a large variation of aberration might be caused with focusing. To correct such variation of aberration, it is necessary to constitute the lens unit that is most contributive to the magnification variation by an increased number of lenses. This necessarily leads to an increase in the weight of the focus lens unit, making high-speed focusing difficult.

In the case where focusing is performed by shifting a lens unit that is small and light-weight, it is difficult to achieve excellent optical performance throughout the entire object distance range because of large variation of aberration with focusing, unless the refractive power of the focus lens unit is selected appropriately.

SUMMARY OF THE INVENTION

A zoom lens according to the present invention comprises a first positive lens unit having a positive refractive power, a second positive lens unit having a positive refractive power arranged adjacent to the first positive lens unit on its image side, and a third positive lens unit having a positive refractive power arranged adjacent to the second positive lens unit on its image side, the distances between the adjacent lens units varying during at least one of zooming and focusing, wherein the zoom lens includes a front lens group including at least one lens unit provided on the object side of the first positive lens unit, the combined focal length of the front lens group at the wide angle end is negative, the second positive lens unit moves along the optical axis toward the image side during focusing from infinity to a short distance, and the zoom lens satisfies the following conditions:

$$1.5 < fp2/fw < 10.0 \text{ and}$$

$$1.0 < |\beta p2w|,$$

where fp2 is the focal length of the second positive lens unit, fw is the focal length of the zoom lens at the wide angle end, and βp2w is the lateral magnification of the second positive lens unit in the state in which the zoom lens is focused at infinity at the wide angle end.

Further features of the present invention will become apparent from the following description of exemplary embodiments with reference to the attached drawings.

BRIEF DESCRIPTION OF THE DRAWINGS

FIG. 8A shows longitudinal aberration diagrams of the zoom lens according to the third embodiment in the state in which the zoom lens is focused at infinity at the wide angle end.

FIG. 8B shows longitudinal aberration diagrams of the zoom lens according to the third embodiment in the state in which the zoom lens is focused at infinity at the telephoto end.

FIG. 10 is a cross sectional view showing the lenses in a zoom lens according to a fourth embodiment at the wide angle end.

DESCRIPTION OF THE EMBODIMENTS

Preferred embodiments of the present invention will now be described in detail in accordance with the accompanying drawings.

In the following, the zoom lens and the image pickup apparatus having the same according to the present invention will be described. The zoom lens according to the present invention has a plurality of lens units and the distances between the lens units change during zooming and/or focusing.

The optical system of the zoom lens includes a first positive lens unit Lp1 having a positive refractive power, a second positive lens unit Lp2 having a positive refractive power arranged on the image side of and adjacent to the first positive lens unit Lp1, and a third positive lens unit Lp3 having a positive refractive power arranged on the image side of and adjacent to the second positive lens unit Lp2. The optical system further includes a front lens group including one or more lens units arranged on the object side of the first positive lens unit Lp1. The front lens group has a negative combined focal length at the wide angle end of the focal length range of the zoom lens. During focusing from infinity to a short distance, the second positive lens unit Lp2 shifts toward the image side along the optical axis. The term "lens unit" refers to a lens system composed of one or more lenses that shift integrally along the optical axis during zooming and/or focusing.

Figure 1:
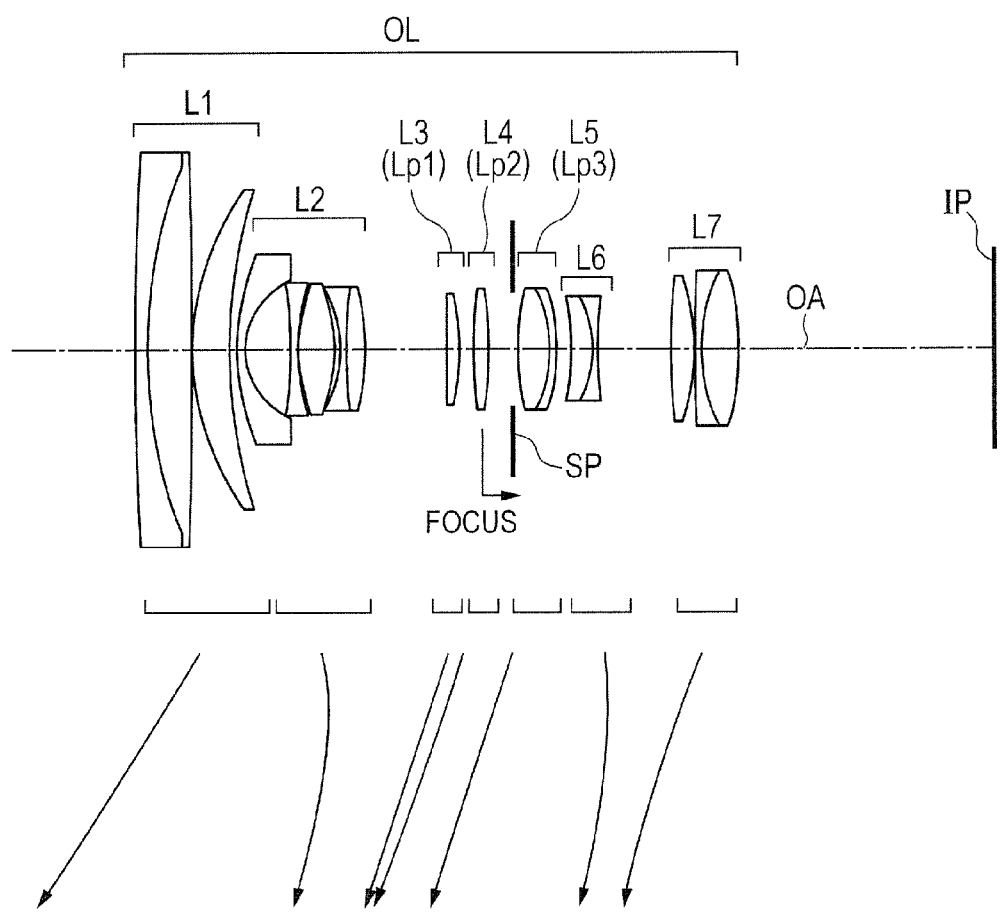
FIG. 1 is a cross sectional view showing the lenses in a zoom lens according to a first embodiment at the wide angle end.
Figure 2A:
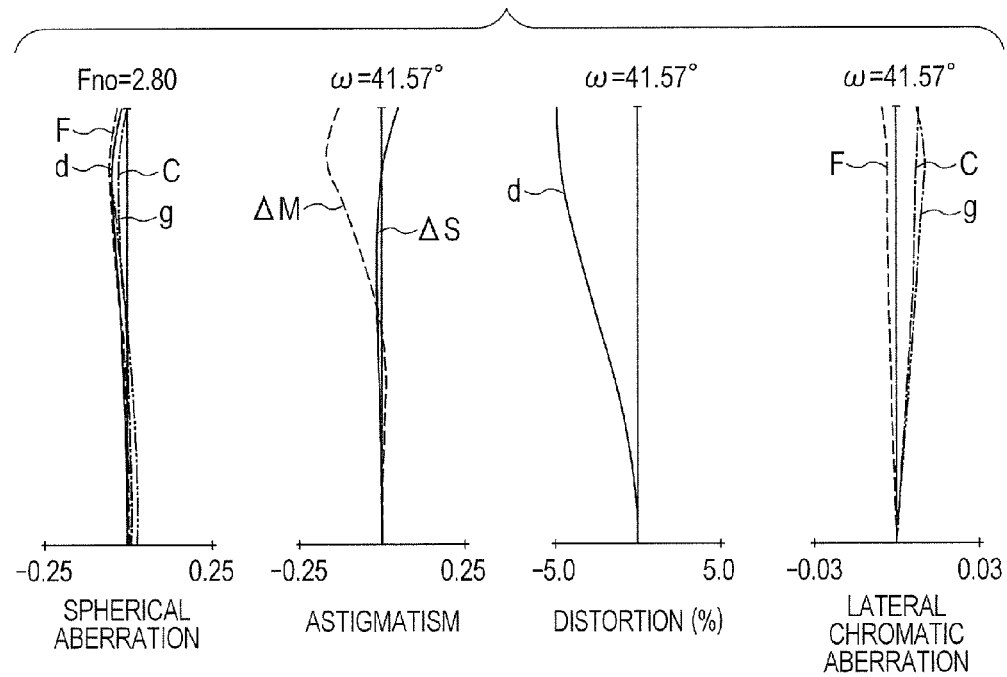
FIG. 2A shows longitudinal aberration diagrams of the zoom lens according to the first embodiment in the state in which the zoom lens is focused at infinity at the wide angle end.
Figure 2B:
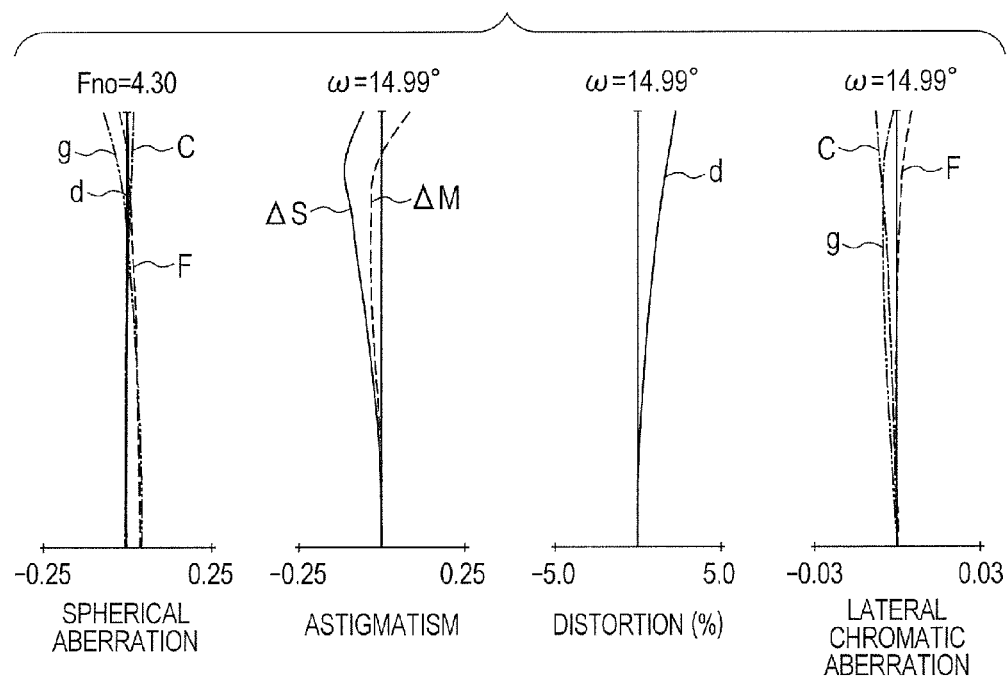
FIG. 2B shows longitudinal aberration diagrams of the zoom lens according to the first embodiment in the state in which the zoom lens is focused at infinity at the telephoto end.
Figure 3A:
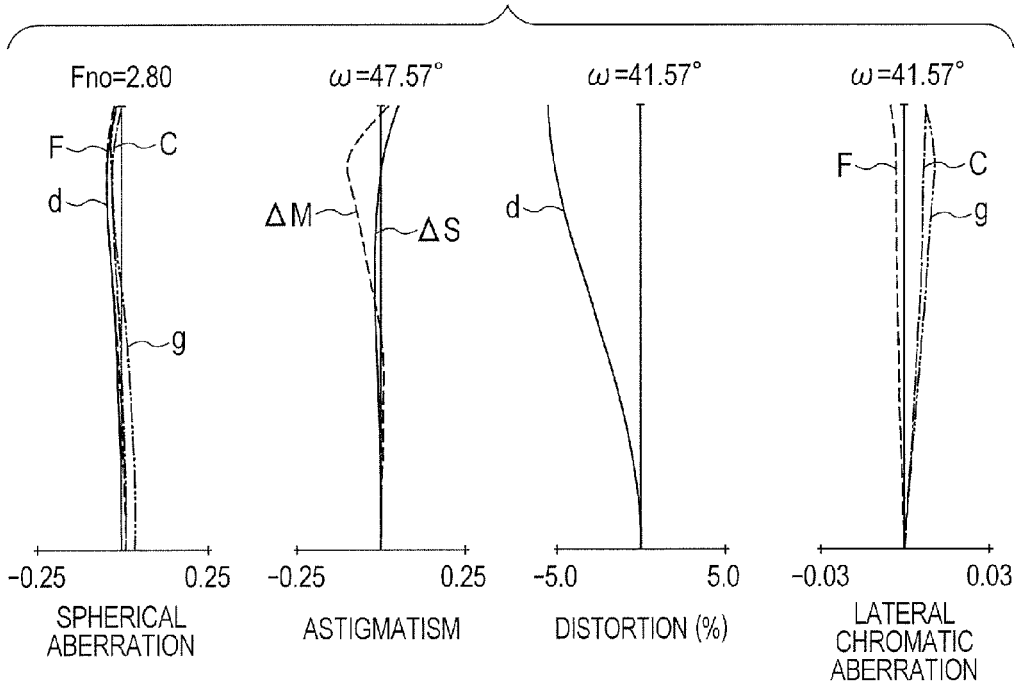
FIG. 3A shows longitudinal aberration diagrams of the zoom lens according to the first embodiment in the state in which the zoom lens is focused at a short distance at the wide angle end.
Figure 3B:
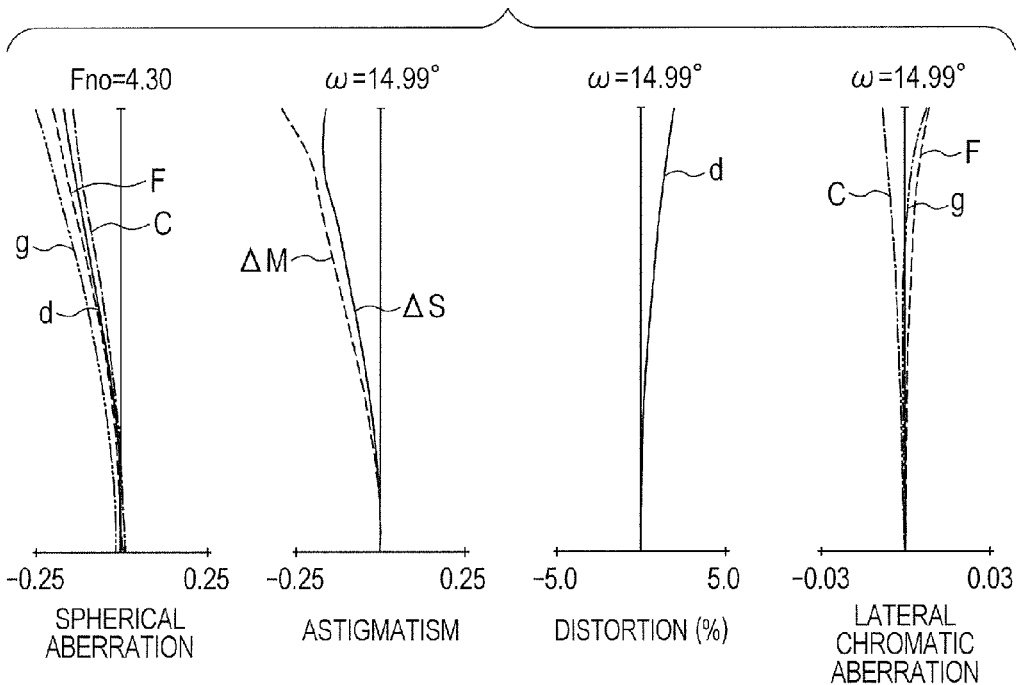
FIG. 3B shows longitudinal aberration diagrams of the zoom lens according to the first embodiment in the state in which the zoom lens is focused at a short distance at the telephoto end.

FIG. 1 is a cross sectional view showing the lenses in a zoom lens according to a first embodiment of the present invention at the wide angle end. FIGS. 2A and 2B are longitudinal aberration diagrams of the zoom lens according to the first embodiment of the present invention at the wide angle end and the telephoto end respectively in the state in which the zoom lens is focused at infinity. FIGS. 3A and 3B are longitudinal aberration diagrams of the zoom lens according to the first embodiment of the present invention at the wide angle end and the telephoto end respectively in the state in which the zoom lens is focused on an object at an object distance of 1.0 meter (short distance). The zoom lens of the first embodiment has a zoom ratio of 3.31 and an f-number varying between 2.80 and 4.30.

Figure 4:
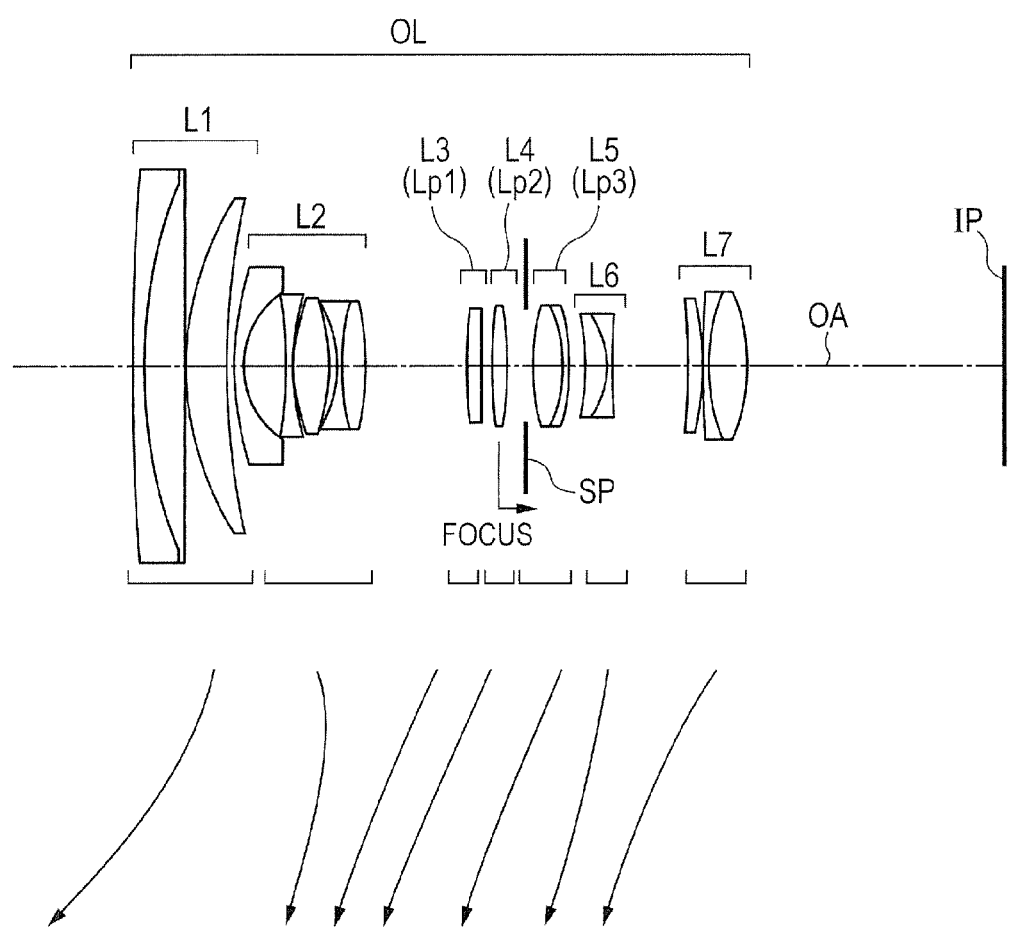
FIG. 4 is a cross sectional view showing the lenses in a zoom lens according to a second embodiment at the wide angle end.
Figure 5A:
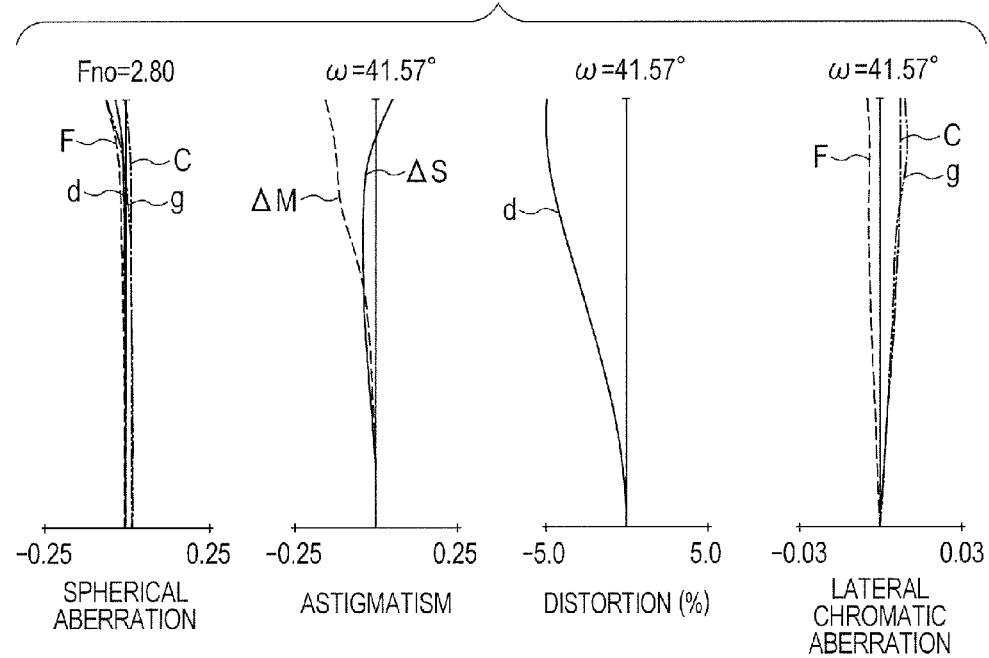
FIG. 5A shows longitudinal aberration diagrams of the zoom lens according to the second embodiment in the state in which the zoom lens is focused at infinity at the wide angle end.
Figure 5B:
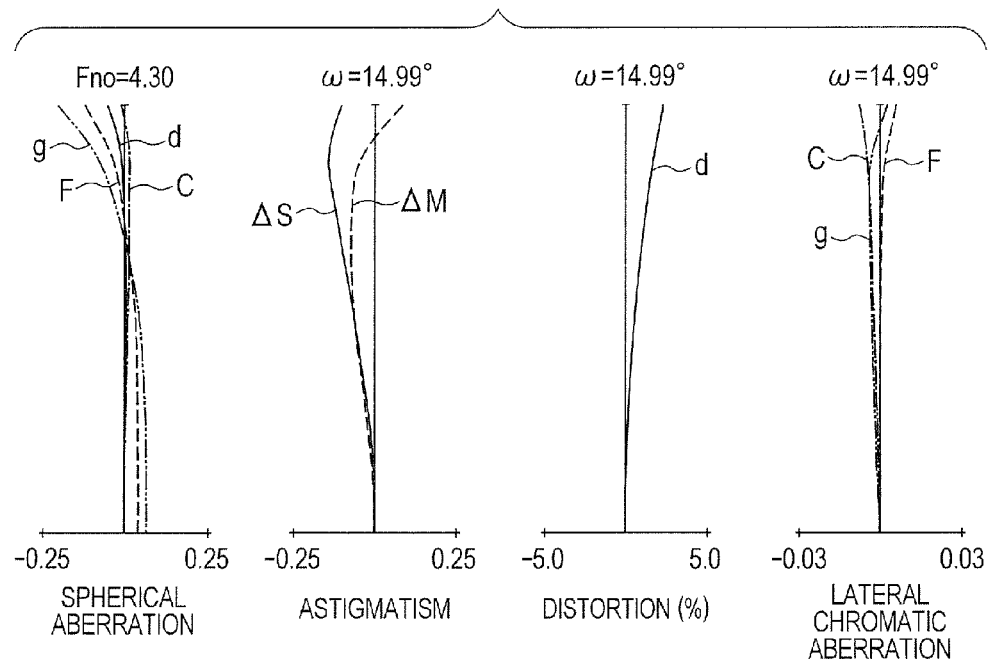
FIG. 5B shows longitudinal aberration diagrams of the zoom lens according to the second embodiment in the state in which the zoom lens is focused at infinity at the telephoto end.
Figure 6A:
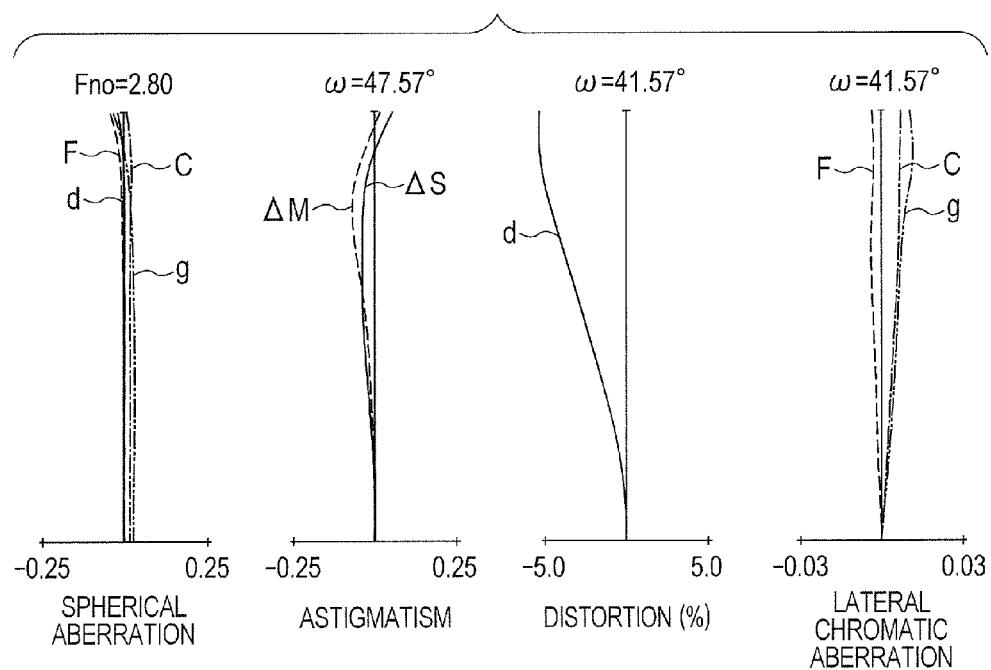
FIG. 6A shows longitudinal aberration diagrams of the zoom lens according to the second embodiment in the state in which the zoom lens is focused at a short distance at the wide angle end.
Figure 6B:
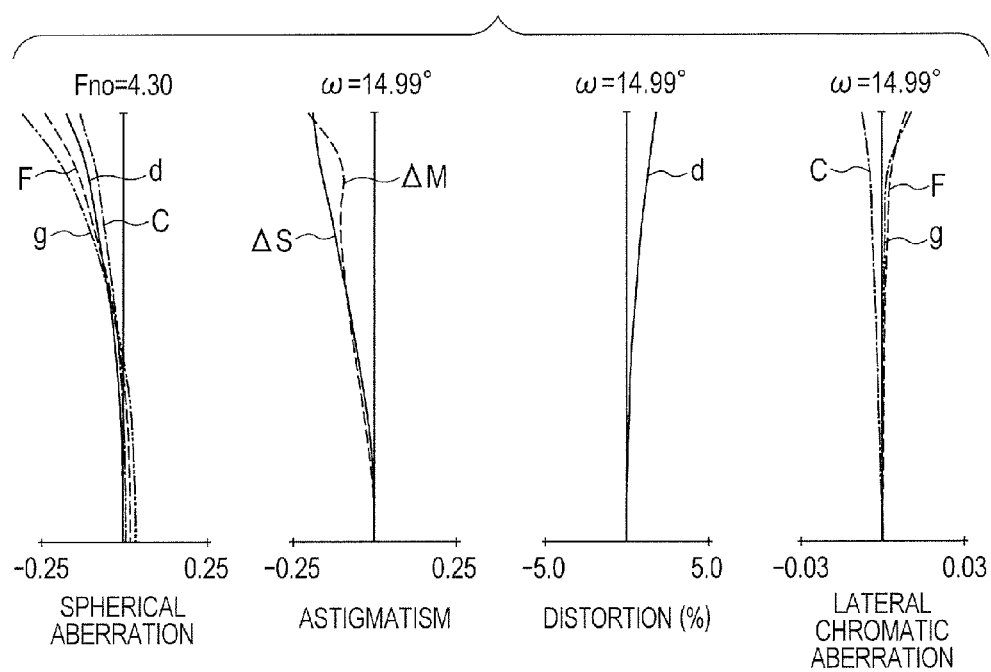
FIG. 6B shows longitudinal aberration diagrams of the zoom lens according to the second embodiment in the state in which the zoom lens is focused at a short distance at the telephoto end.

FIG. 4 is a cross sectional view showing the lenses in a zoom lens according a second embodiment at the wide angle end. FIGS. 5A and 5B are longitudinal aberration diagrams of the zoom lens according to the second embodiment of the present invention at the wide angle end and the telephoto end respectively in the state in which the zoom lens is focused at infinity. FIGS. 6A and 6B are longitudinal aberration diagrams of the zoom lens according to the second embodiment of the present invention at the wide angle end and the telephoto end respectively in the state in which the zoom lens is focused on an object at an object distance of 1.0 meter (short distance). The zoom lens of the second embodiment has a zoom ratio of 3.31 and an f-number varying between 2.80 and 4.14.

Figure 7:
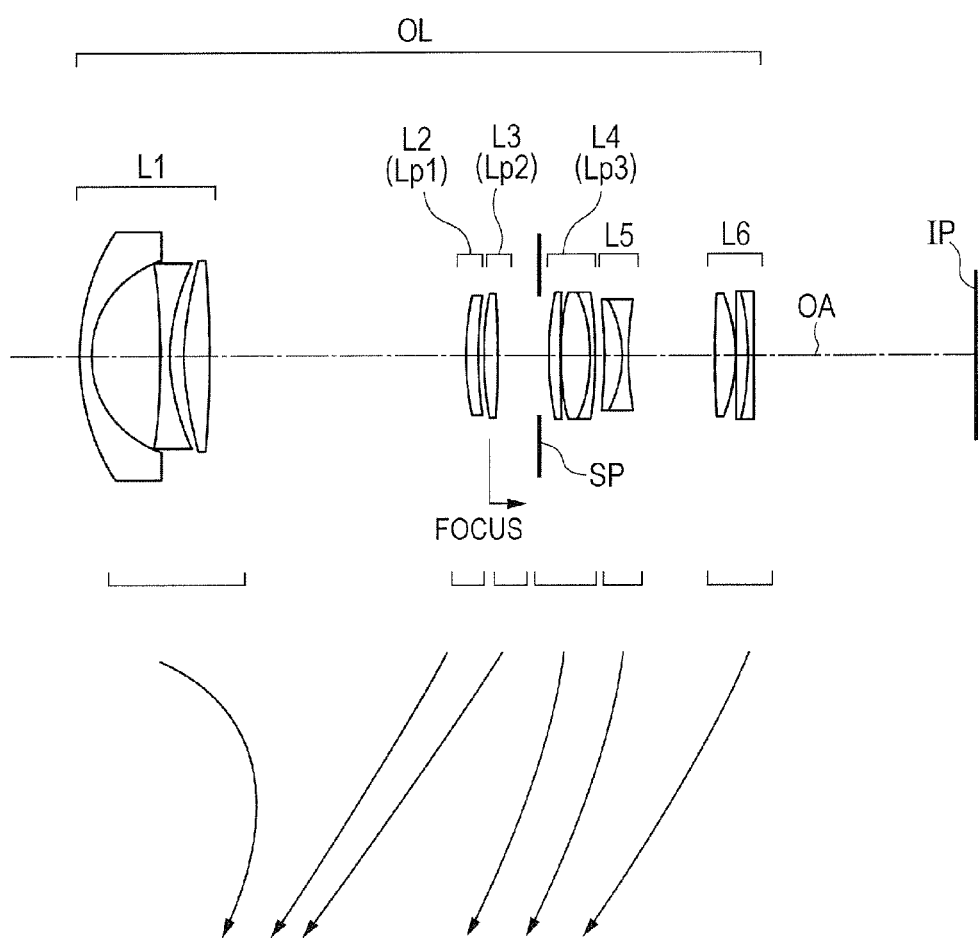
FIG. 7 is a cross sectional view showing the lenses in a zoom lens according to a third embodiment at the wide angle end.
Figure 9A:
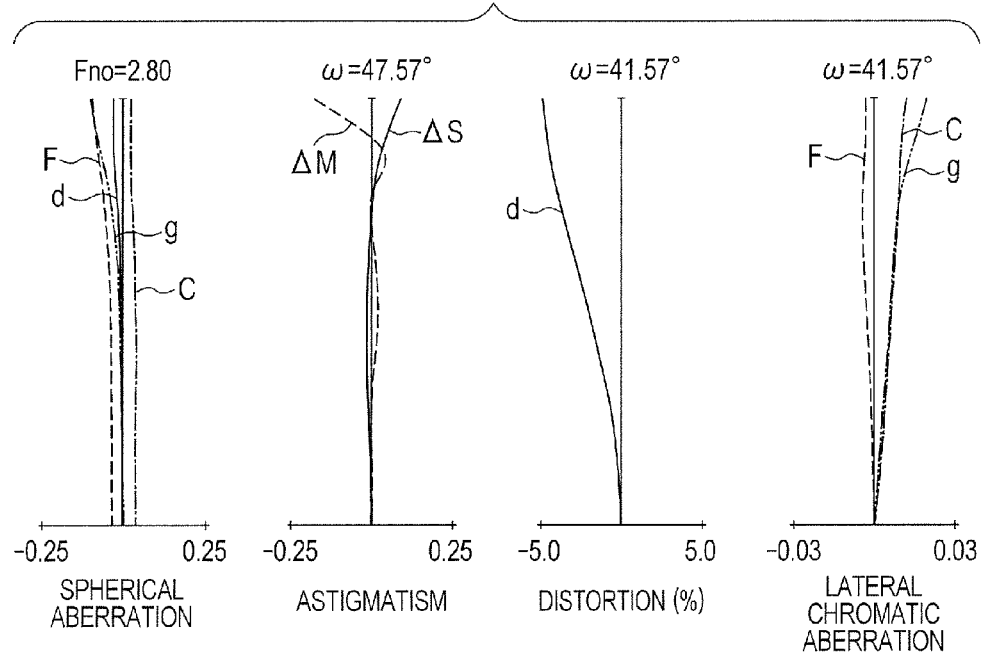
FIG. 9A shows longitudinal aberration diagrams of the zoom lens according to the third embodiment in the state in which the zoom lens is focused at a short distance at the wide angle end.
Figure 9B:
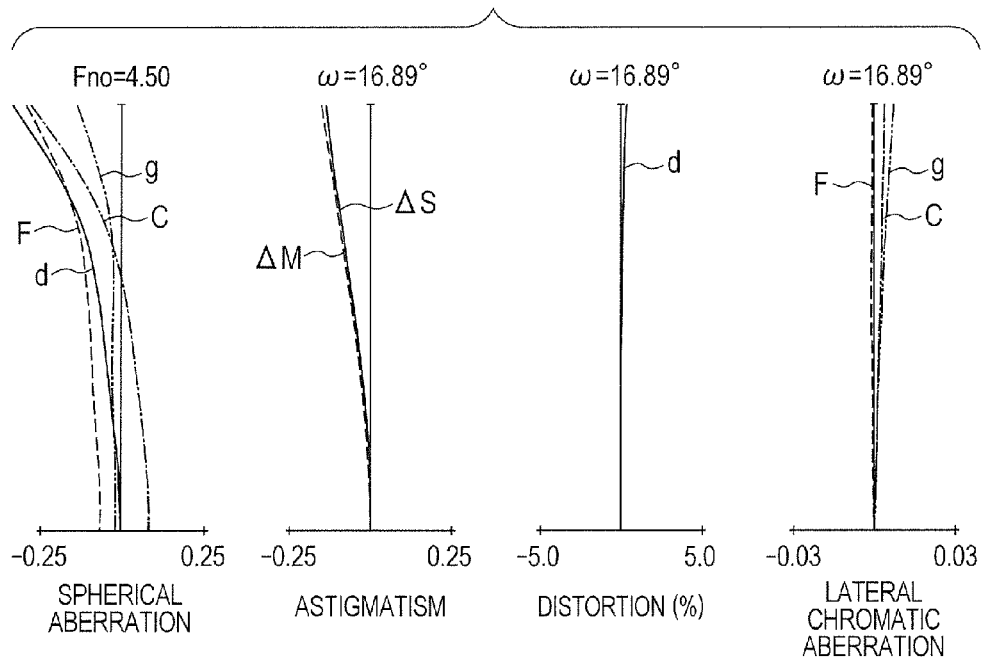
FIG. 9B shows longitudinal aberration diagrams of the zoom lens according to the third embodiment in the state in which the zoom lens is focused at a short distance at the telephoto end.

FIG. 7 is a cross sectional view showing the lenses in a zoom lens according a third embodiment at the wide angle end. FIGS. 8A and 8B are longitudinal aberration diagrams of the zoom lens according to the third embodiment of the present invention at the wide angle end and the telephoto end respectively in the state in which the zoom lens is focused at infinity. FIGS. 9A and 9B are longitudinal aberration diagrams of the zoom lens according to the third embodiment of the present invention at the wide angle end and the telephoto end respectively in the state in which the zoom lens is focused on an object at an object distance of 1.0 meter (short distance). The zoom lens of the third embodiment has a zoom ratio of 2.92 and an f-number varying between 2.80 and 4.50.

Figure 11A:
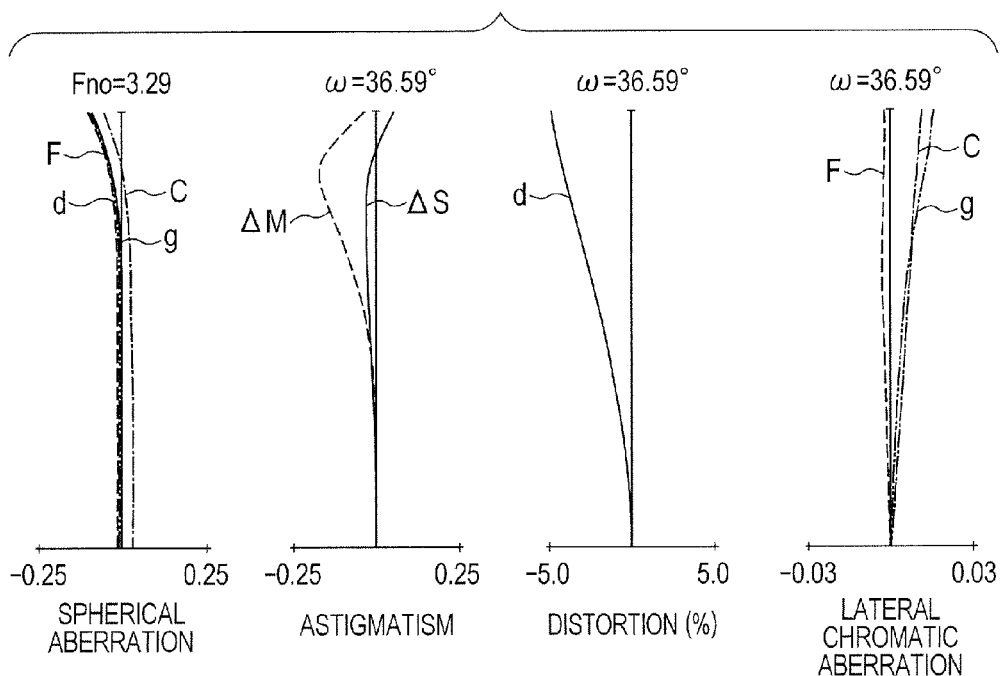
FIG. 11A shows longitudinal aberration diagrams of the zoom lens according to the fourth embodiment in the state in which the zoom lens is focused at infinity at the wide angle end.
Figure 11B:
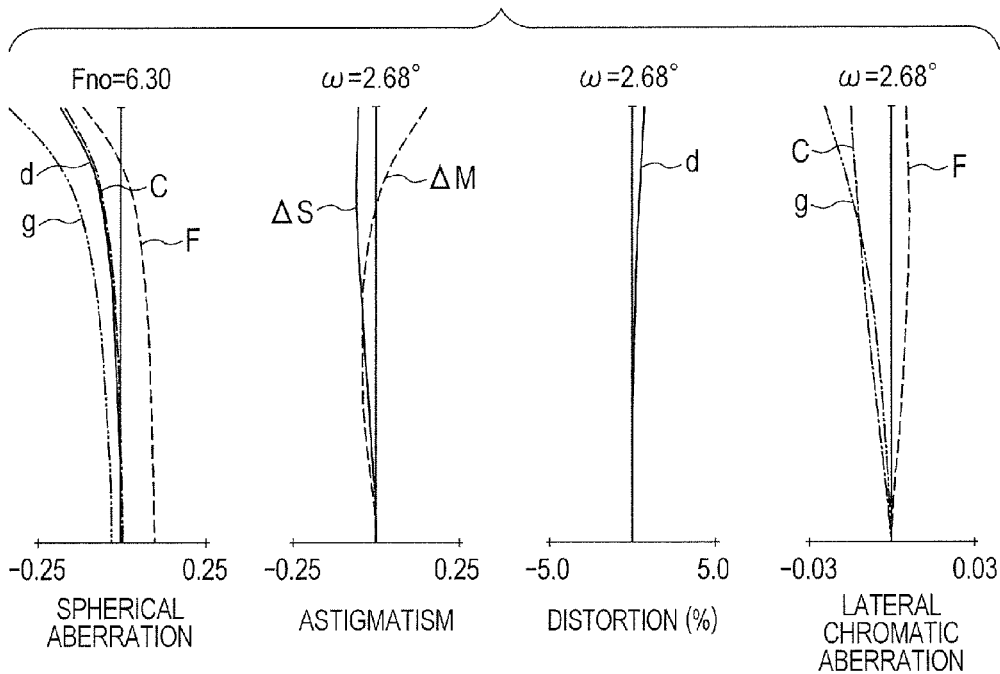
FIG. 11B shows longitudinal aberration diagrams of the zoom lens according to the fourth embodiment in the state in which the zoom lens is focused at infinity at the telephoto end.
Figure 12A:
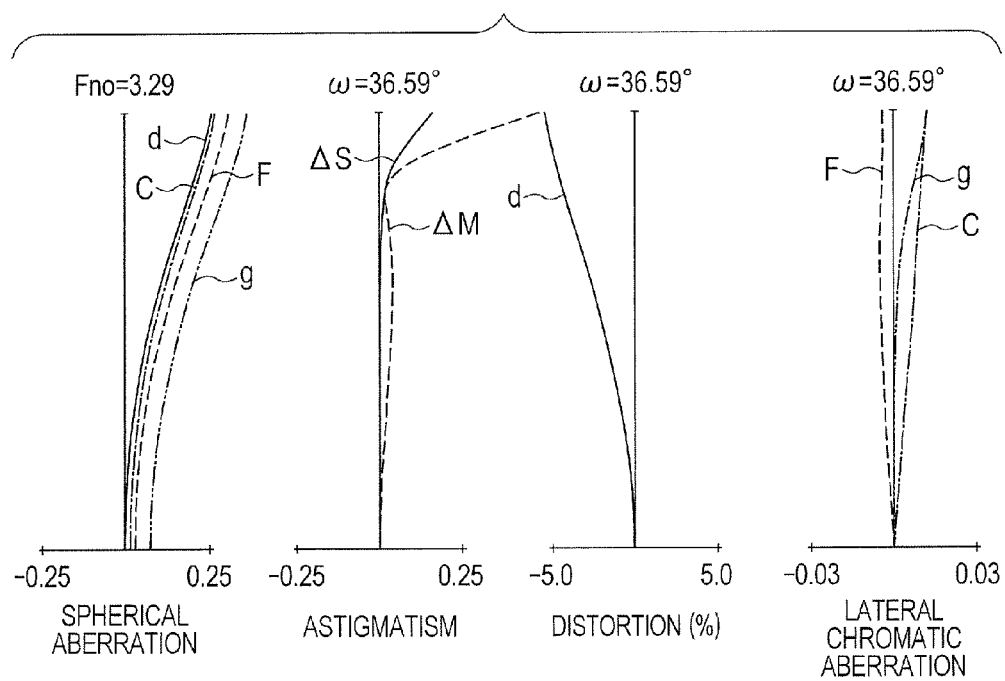
FIG. 12A shows longitudinal aberration diagrams of the zoom lens according to the fourth embodiment in the state in which the zoom lens is focused at a short distance at the wide angle end.
Figure 12B:
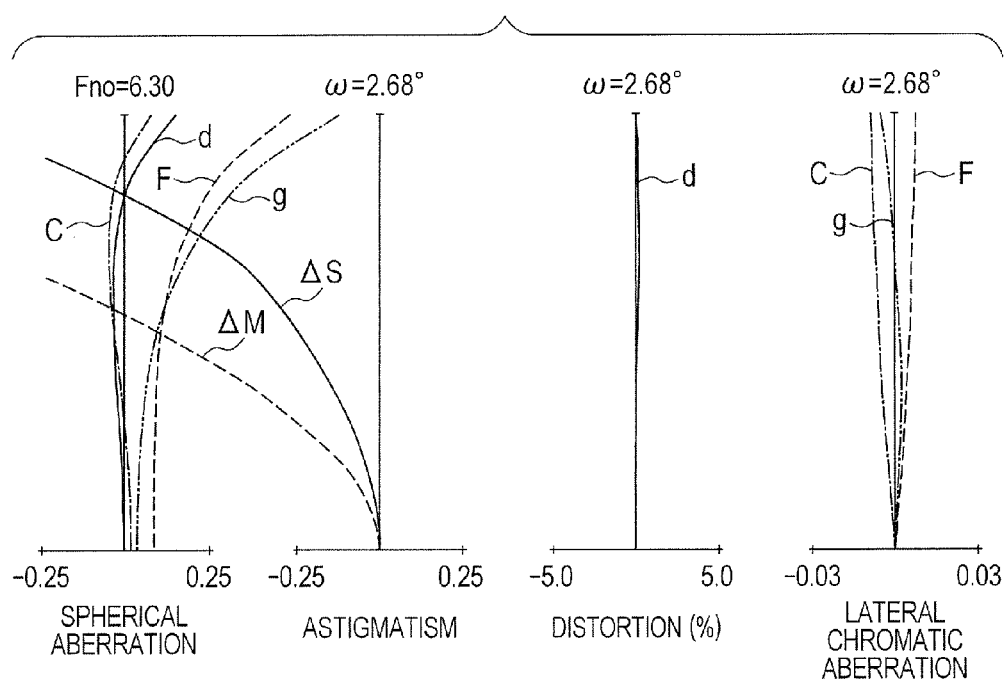
FIG. 12B shows longitudinal aberration diagrams of the zoom lens according to the fourth embodiment in the state in which the zoom lens is focused at a short distance at the telephoto end.

FIG. 10 is a cross sectional view showing the lenses in a zoom lens according a fourth embodiment at the wide angle end. FIGS. 11A and 11B are longitudinal aberration diagrams of the zoom lens according to the fourth embodiment of the present invention at the wide angle end and the telephoto end respectively in the state in which the zoom lens is focused at infinity. FIGS. 12A and 12B are longitudinal aberration diagrams of the zoom lens according to the fourth embodiment of the present invention at the wide angle end and the telephoto end respectively in the state in which the zoom lens is focused on an object at an object distance of 1.0 meter (short distance). The zoom lens of the fourth embodiment has a zoom ratio of 5.87 and an f-number varying between 3.29 and 6.30.

Figure 13:
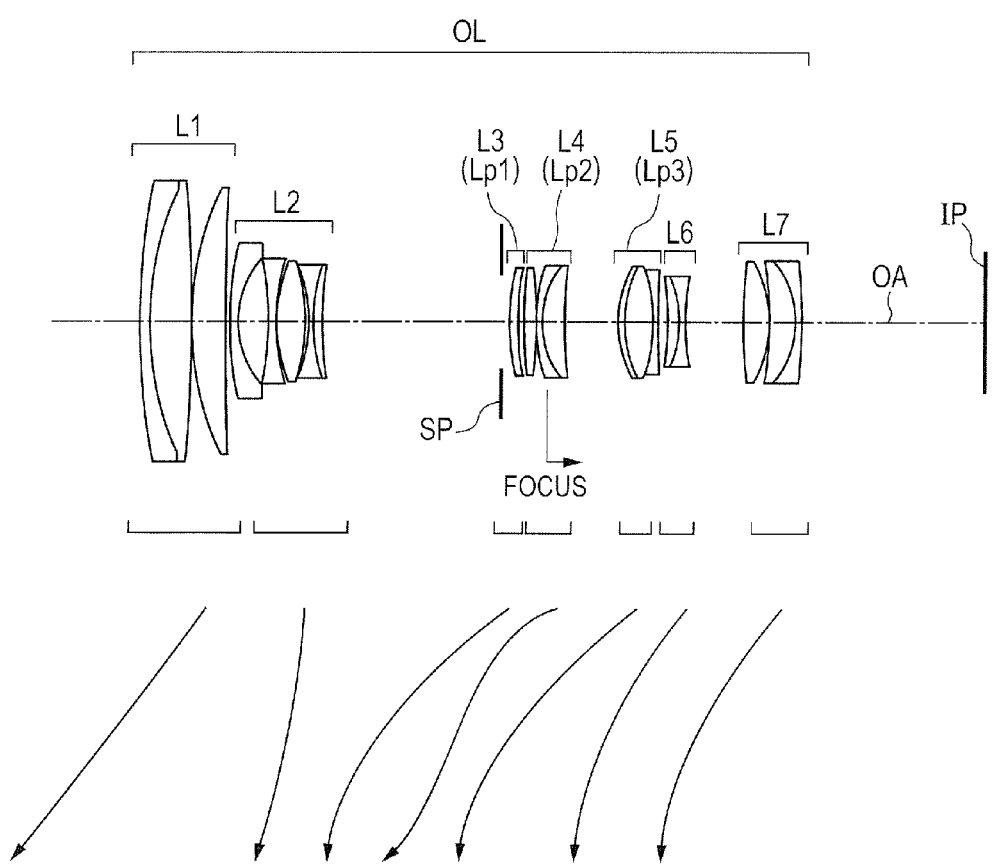
FIG. 13 is a cross sectional view showing the lenses in a zoom lens according to a fifth embodiment at the wide angle end.
Figure 14A:
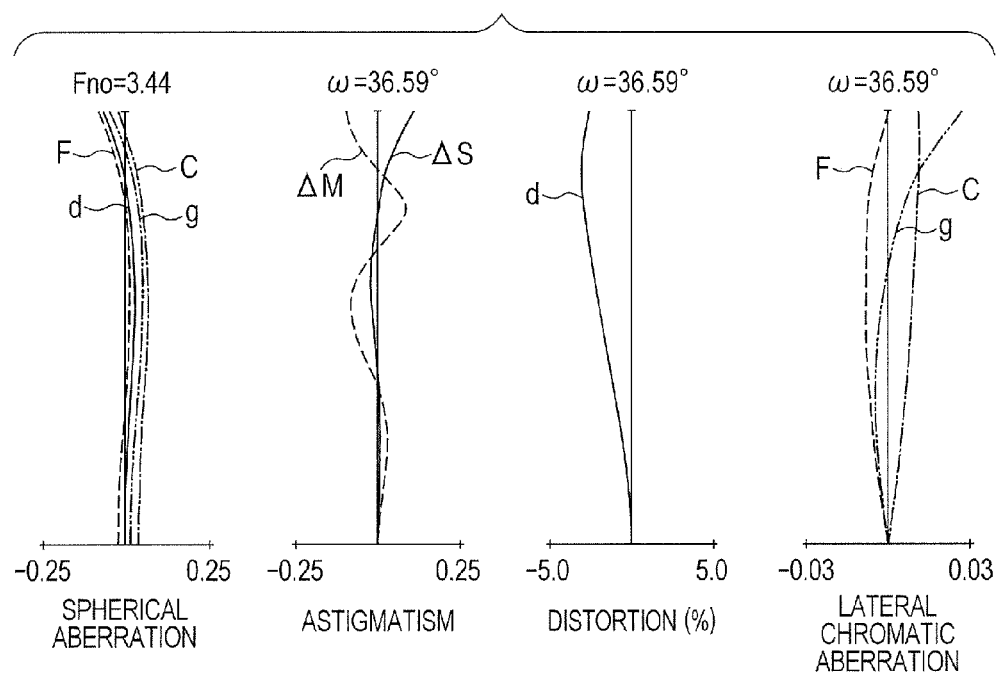
FIG. 14A shows longitudinal aberration diagrams of the zoom lens according to the fifth embodiment in the state in which the zoom lens is focused at infinity at the wide angle end.
Figure 14B:
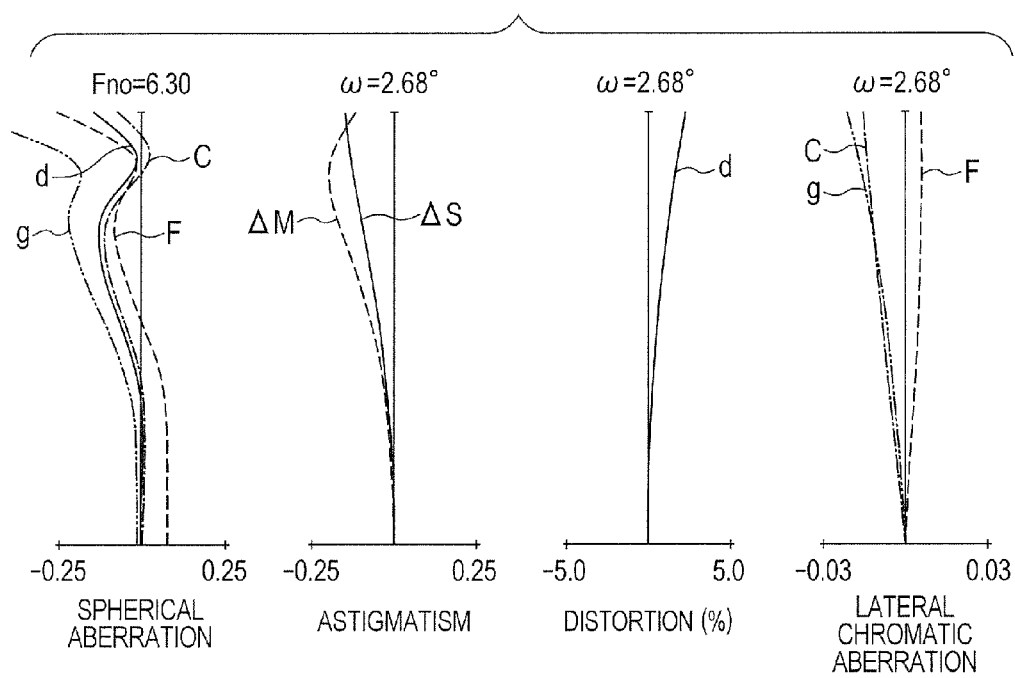
FIG. 14B shows longitudinal aberration diagrams of the zoom lens according to the fifth embodiment in the state in which the zoom lens is focused at infinity at the telephoto end.
Figure 15A:
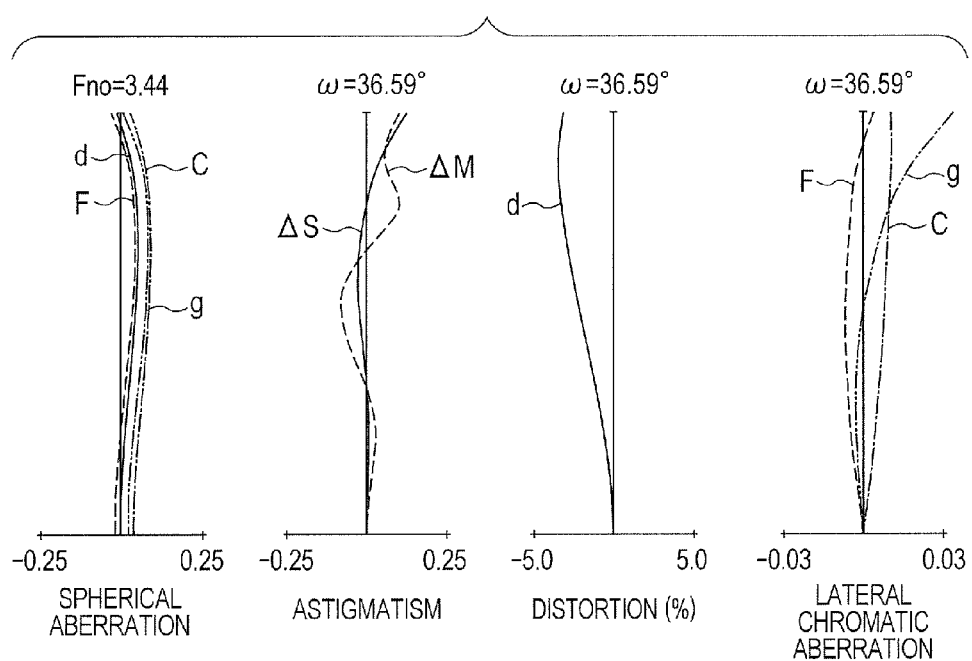
FIG. 15A shows longitudinal aberration diagrams of the zoom lens according to the fifth embodiment in the state in which the zoom lens is focused at a short distance at the wide angle end.
Figure 15B:
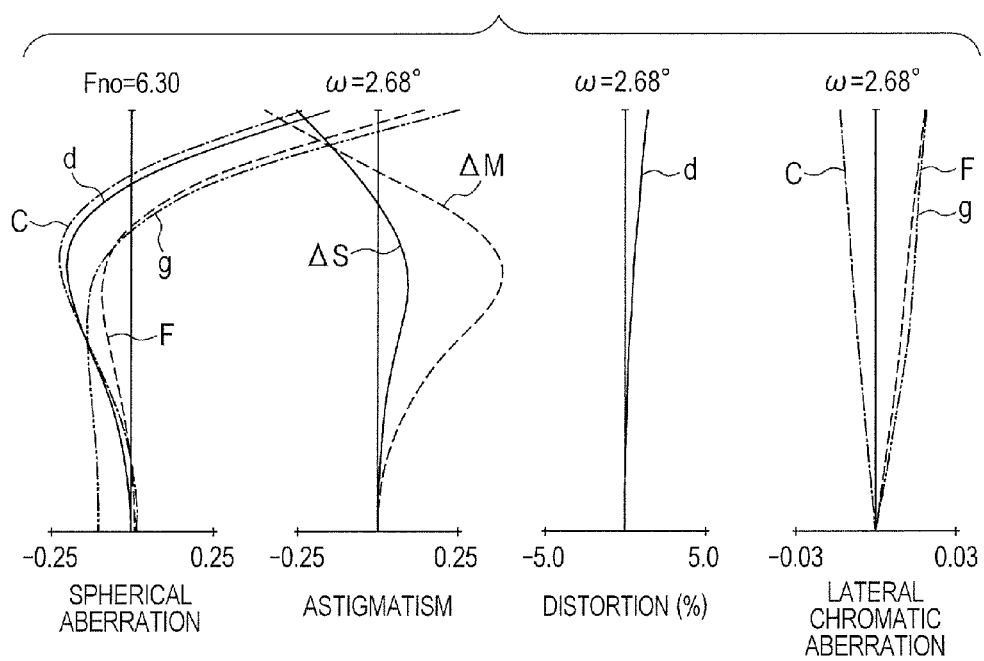
FIG. 15B shows longitudinal aberration diagrams of the zoom lens according to the fifth embodiment in the state in which the zoom lens is focused at a short distance at the telephoto end.
Figure 16:
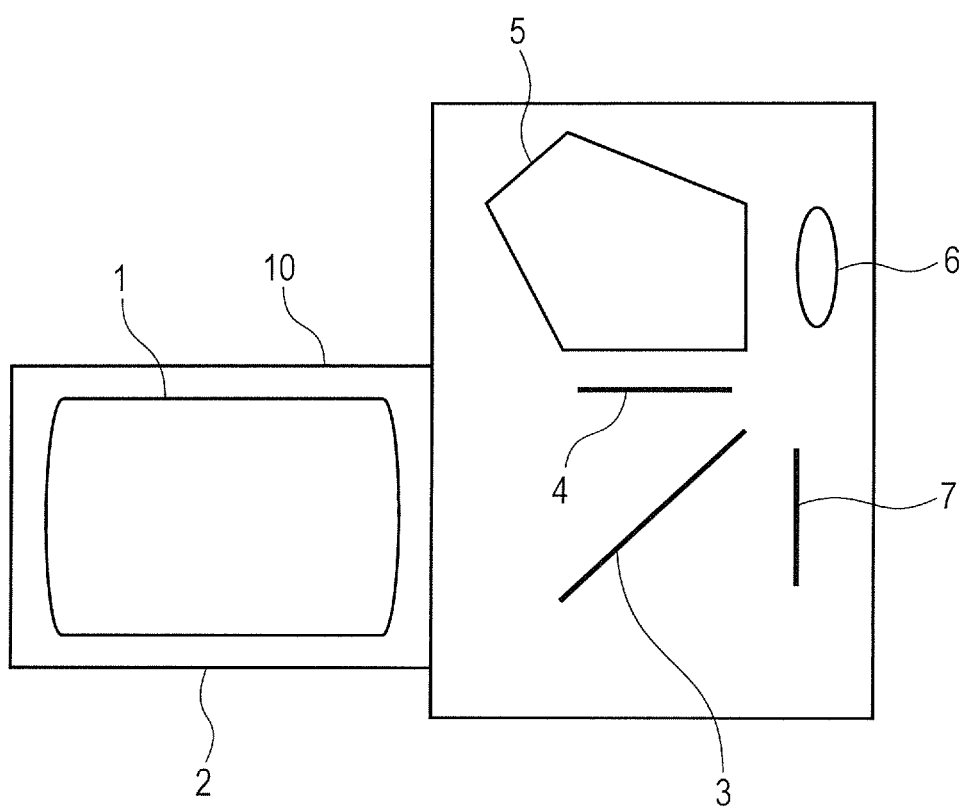
FIG. 16 is a diagram showing relevant portions of an image pickup apparatus according to the present invention.

FIG. 13 is a cross sectional view showing the lenses in a zoom lens according a fifth embodiment at the wide angle end. FIGS. 14A and 14B are longitudinal aberration diagrams of the zoom lens according to the fifth embodiment of the present invention at the wide angle end and the telephoto end respectively in the state in which the zoom lens is focused at infinity. FIGS. 15A and 15B are longitudinal aberration diagrams of the zoom lens according to the fifth embodiment of the present invention at the wide angle end and the telephoto end respectively in the state in which the zoom lens is focused on an object at an object distance of 1.0 meter (short distance). The zoom lens of the fifth embodiment has a zoom ratio of 15.87 and an f-number varying between 3.44 and 6.30. FIG. 16 shows a schematic view of the principal part of an image pickup apparatus having the zoom lens of the present invention.

The zoom lenses according to the embodiments are image pickup optical systems for use in image pickup apparatuses such as digital still cameras and film cameras. In the cross sectional views of the zoom lenses, the left side is the object side (front side), and the right side is the image side (rear side). When the zoom lenses according to the embodiments are used as projection lenses of projectors or the like, the left side is oriented to the screen, and the right side is oriented to the image to be projected. In the cross sectional views, the zoom lens OL includes lens units Li (i=1, 2, 3, . . . ), where the lens unit number i is counted in order from the object side.

Each zoom lens includes a first positive lens unit Lp1 having a positive refractive power, a second positive lens unit Lp2 having a positive refractive power that is shifted during focusing, and a third positive lens unit Lp3 having a positive refractive power.

In the cross sectional views, an aperture stop SP (a stop that determines the f-number) and the image plane IP are also shown. In cases where the zoom lens is used as an image pickup optical system of a video camera or a digital still camera, the image pickup surface of a solid-state image pickup element (photoelectric conversion element) such as a CCD sensor or CMOS sensor is provided at the position of the image plane IP. In cases where the zoom lens is used as an image pickup optical system of a film camera, the film surface is located at the position of the image plane. Arrows in the cross sectional views indicate loci of movement of the lens units during zooming from the wide angle end to the telephoto end. The arrow captioned as "FOCUS" indicates the direction of movement of the lens unit during focusing from infinity to a short distance.

In spherical longitudinal aberration diagrams, the solid line d shows the aberration for the d-line (wavelength of 587.6 nm), the two-dot chain line g shows the aberration for the g-line (wavelength of 435.8 nm), the chain line C shows the aberration for the C-line (wavelength of 656.3 nm), and the broken line F shows the aberration for the F-line (wavelength of 486.1 nm). In the astigmatism diagrams, the broken line ΔM represents the meridional image plane, and the solid line ΔS represents the sagittal image plane. The distortion is shown for the d-line. The lateral chromatic aberration is shown for the g-line, the F-line, and the C-line. In the longitudinal aberration diagrams, the half angle of view w and the f-number Fno are also shown. In the following description of the embodiments, the terms "wide angle end" and "telephoto end" refer to the zoom positions that are assumed when the lens unit for zooming is located at the ends of its mechanically movable range along the optical axis.

The zoom lenses according to the embodiments satisfy the following conditions:

$$1.5 < fp2/fw < 10.0 \tag{1}$$

and $$1.0 < |\beta p2w| \tag{2},$$

where fp2 is the focal length of the second positive lens unit Lp2, βp2w is the lateral magnification of the second positive lens unit Lp2 in the state in which the zoom lens is focused at infinity at the wide angle end, and fw is the focal length of the zoom lens at the wide angle end.

Now, difference between the lens configuration of the zoom lenses according to the embodiments and the lens configuration of the zoom lenses disclosed in the aforementioned Japanese Patent Application Laid-Open No. 2009-251114 and Japanese Patent Application Laid-Open No. 2012-247687 will be described. The zoom lens system disclosed in the aforementioned Japanese Patent Application Laid-Open No. 2009-251114 is configured to perform zooming by shifting the third lens unit having a positive refractive power, and the combined focal length of the lens group located on the object side of the third lens unit is negative throughout the entire zoom range. In this zoom lens system, the third lens unit is designed to have the optical function of converging the rays diverged by the negative refractive power of the object side lens group.

Thus, the third lens unit is designed to have a relatively high positive refractive power. Therefore, shifting this third lens unit for focusing tends to lead to a large variation of aberration. The image pickup lens disclosed in the aforementioned Japanese Patent Application Laid-Open No.

2012-247687 is configured to perform focusing by shifting the second lens unit having a positive refractive power, and the combined focal length of the lens group on the object side of the second lens unit is negative throughout the entire zoom range.

In this taking lens also, the second lens unit is designed to have the optical function of converging the rays diverged by the negative refractive power of the object side lens group, and the second lens unit is designed to have a relatively high positive refractive power. Therefore, shifting this second lens unit for focusing tends to lead to a large variation of aberration.

In the zoom lenses according to the embodiments of the present invention, a first positive lens unit LP1 having a positive refractive power is provided additionally on the object side of the second positive lens unit Lp2 for focusing. Moreover, a third positive lens unit LP3 having a positive refractive power is provided on the image side of the second positive lens unit Lp2 for focusing. This refractive power arrangement allows a reduction of the positive refractive power of the second positive lens unit Lp2 for focusing, making the variation of aberration with focusing smaller.

In other words, in the zoom lenses according to the embodiments of the present invention, the function of converging divergent rays coming from the object side is distributed to the lens units Lp1, Lp2, and Lp3 and the subsequent rear lens group. This prevents the second positive lens unit Lp2 for focusing from having an excessively high refractive power, helping reduction of the variation of aberration during focusing.

In the zoom lens according to the present invention, variation of aberration with focusing, in particular variation of spherical aberration is reduced advantageously by the above-described refractive power arrangement.

Now, we will describe the technical meaning of the aforementioned conditions (1) and (2). In condition (1), the focal length of the second positive lens unit Lp2 for focusing is normalized by the focal length of the zoom lens at the wide angle end.

If the positive refractive power of the second positive lens unit Lp2 is so high that the value fp2/fw falls below the lower limit value in condition (1), aberrations vary largely with focusing, because the lens unit having a high refractive power is shifted. If the positive refractive power of the second positive lens unit Lp2 is so low that the value of fp2/fw exceeds the upper limit value in condition (1), the amount of shift of the second positive lens unit Lp2 during focusing is necessitated to be large. Then, it is necessary to provide a large space allowing the long shift of the second positive lens unit Lp2, undesirably leading to an increase in the overall length of the zoom lens.

Condition (2) limits the paraxial lateral magnification of the second positive lens unit Lp2 for focusing in the state in which the zoom lens is focused at infinity at the wide angle end. It is known that the position sensitivity of the focus lens unit is generally proportional to $(1-\beta^2)$, where $\beta$ is the paraxial lateral magnification. Therefore, to make the position sensitivity of the focus lens unit high, it is preferable that the absolute value of the paraxial lateral magnification $\beta$ of the focus lens unit be larger than 1.

If the value of $|\beta p2w|$ falls below the lower limit value in condition (2), the position sensitivity is so low that it is necessary to provide a large space that allows a long shift of the focus lens unit during focusing. This undesirably leads to an increase in the overall length of the zoom lens.

As above, satisfying the conditions (1) and (2) enables downsizing of the zoom lens and reduction of variation of aberration with focusing.

It is more preferred that the value ranges of the conditions (1) and (2) be further limited as follows.

$$1.9 < fp2/fw < 8.0 \quad (1a)$$

$$1.0 < |\beta p2w| < 10.0 \quad (2a)$$

It is still more preferred that the value ranges of the conditions (1a) and (2a) be further limited as follows.

$$2.3 < fp2/fw < 6.0 \quad (1b)$$

$$1.5 < |\beta p2w| < 8.0 \quad (2b)$$

As exemplified by the above-described embodiments, there can easily be provided zoom lenses that can easily perform high speed focusing with small variation of aberration with focusing and has excellent optical performance throughout the entire object distance range while being small in overall size.

It is preferred that the zoom lens according to the embodiments further satisfy one or more of the following conditions, where fp3 is the focal length of the third positive lens unit Lp3, fpw is the focal length of the combined lens system composed of the first positive lens unit Lp1, the second positive lens unit Lp2, and the third positive lens unit Lp3 at the wide angle end, frw is the focal length of a rear lens group composed of one or more lens units arranged on the image side of the third positive lens unit Lp3 at the wide angle end, βp2t is the lateral magnification of the second positive lens unit Lp2 in the state in which the zoom lens is focused at infinity at the telephoto end, fp1 is the focal length of the first positive lens unit Lp1, βp1w is the lateral magnification of the first positive lens unit Lp1 in the state in which the zoom lens is focused at infinity at the wide angle end, ff1 is the focal length of the front lens group at the wide angle end, and ff2 is the combined focal length of the front lens group, the first positive lens unit Lp1 and the second positive lens unit Lp2 at the wide angle end.

$$0.55 < fp2/fp3 < 5.00 \quad (3)$$

$$0.2 < fw/fpw < 1.0 \quad (4)$$

$$1.0 < |frw/fpw| \quad (5)$$

$$1.0 < |\beta p2t| \quad (6)$$

$$2.0 < fp1/fw < 40.0 \quad (7)$$

$$1.10 < |\beta p1w| \quad (8)$$

$$-4.0 < ff1/fw < -0.5 \quad (9)$$

$$-6.0 < ff2/fw < -0.5 \quad (10)$$

Technical meaning of the above conditions will be described. Condition (3) relates to the ratio of the focal length of the second positive lens unit Lp2 and the focal length of the third positive lens unit Lp3. If the positive refractive power of the second positive lens unit Lp2 is relatively so high or the positive refractive power of the third positive lens unit Lp3 is relatively so low that the value of fp2/fp3 falls below the lower limit value in condition (3), aberrations vary largely with focusing. This is undesirable. Moreover, if the positive refractive power of the third positive lens unit Lp3 is low, its ray converging effect is low, leading to an increase in the overall size of the optical system. This is also undesirable.

If the positive refractive power of the second positive lens unit Lp2 is relatively so low or the positive refractive power of the third positive lens unit Lp3 is relatively so high that the value of fp2/fp3 exceeds the upper limit value in condition (3), a space required to drive the second positive lens unit Lp2 for focusing is necessitated to be large, leading to an increase in the overall lens length. This is undesirable. By satisfying condition (3), the overall size of the zoom lens can be kept small, and variation of aberration with focusing is kept small. It is more preferred that the numerical range of condition (3) be further limited as follows:

$$0.60<fp2/fp3<4.00 \tag{3a}$$

Condition (4) relates to the ratio of the focal length of the zoom lens at the wide angle end to the focal length of the combined lens system composed of the first positive lens unit Lp1 having a positive refractive power, the second positive lens unit Lp2 having a positive refractive power, and the third positive lens unit Lp3 having a positive refractive power. If the positive refractive power of the combined lens system is so low that the value of fw/fpw falls below the lower limit value in condition (4), the ray converging effect of the combined lens unit is low, leading to an increase in the overall size of the zoom lens.

If the positive refractive power of the combined lens system is so high that the value of fw/fpw exceeds the upper limit value in condition (4), it is necessary to additionally provide a lens unit having a high negative refractive power in order to correct overall aberrations excellently. This leads to an increase in the size of the zoom lens. Then, it is undesirably difficult to keep the overall size of the zoom lens small and to correct aberrations excellently.

As above, by satisfying condition (4), the size of the optical system is kept small, and aberrations of the entire optical system is corrected excellently.

It is more preferred that the numerical range of condition (4) be further limited as follows:

$$0.3<fw/fpw<0.9 \tag{4a}$$

It is more preferred that the numerical range of condition (4a) be further limited as follows:

$$0.4<fw/fpw<0.8 \tag{4b}$$

Condition (5) relates to the ratio of the combined focal length of the rear lens group composed of the lens units arranged on the image side of the third positive lens unit Lp3 to the combined focal length of the combined lens system composed of the first positive lens unit Lp1 having a positive refractive power, the second positive lens unit Lp2 having a positive refractive power and the third positive lens unit Lp3 having a positive refractive power. If the positive refractive power of the combined lens system is so low that the value of |frw/fpw| falls below the lower limit value in condition (5), the overall size of the zoom lens tends to become large.

As above, by satisfying condition (5), the size of the optical system is kept small, and aberrations of the entire optical system is corrected excellently.

It is more preferred that the numerical range of condition (5) be further limited as follows:

$$1.0<|frw/fpw|<50.0 \tag{5a}$$

It is more preferred that the numerical range of condition (5a) be further limited as follows:

$$2.0<|frw/fpw|<45.0 \tag{5b}$$

The value of exceeds the upper limit values of |frw/fpw| are defined in conditions (5a) and (5b) to provide the aberration correction effect to the rear lens group. Beyond the upper limit, the aberration correction effect of the rear lens group becomes small.

Condition (6) relates to the lateral magnification $\beta p2t$ of the second positive lens unit Lp2 for focusing in the state in which the zoom lens is focused at infinity at the telephoto end. As with condition (2), condition (6) is set to enhance the position sensitivity of the second positive lens unit Lp2 for focusing at the telephoto end. If the lower limit value in condition (6) is not reached, the position sensitivity is so low that it is necessary to provide a large space allowing shift of the second positive lens unit Lp2 for focusing. This undesirably leads to an increase in the overall size of the zoom lens.

It is more preferred that the numerical range of condition (6) be further limited as follows:

$$1.0<|\beta p2t|<20.0 \tag{6a}$$

It is more preferred that the numerical range of condition (6a) be further limited as follows:

$$1.5<|\beta p2t|<15.0 \tag{6b}$$

Condition (7) relates to the focal length of the first positive lens unit Lp1. If the positive refractive power of the first positive lens unit Lp1 is so strong that the value of fp1/fw falls below the lower limit value in condition (7), beams incident on the second positive lens unit Lp2 for focusing arranged on the image side changes from being incident divergently to being incident convergently. Then, the object distance for the second positive lens unit Lp2 is long, leading to difficulties in making the lateral magnification high. In consequence, the amount of shift of the second positive lens unit Lp2 for focusing is necessitated to be large, leading to an increase in the overall size of the zoom lens. On the other hand, if the positive refractive power of the first positive lens unit Lp1 is so low that the value of fp1/fw exceeds the upper limit value in condition (7), its ray converging effect is so low that it is difficult to share the refractive power between the first positive lens unit Lp1 and the second positive lens unit Lp2 appropriately. This is undesirable.

As above, by satisfying condition (7), the size of the optical system is kept small, and the variation of aberrations with focusing is kept small.

It is more preferred that the numerical range of condition (7) be further limited as follows:

$$3.0<fp1/fw<35.0 \tag{7a}$$

It is more preferred that the numerical range of condition (7a) be further limited as follows:

$$5.0<fp1/fw<30.0 \tag{7b}$$

Satisfying condition (8) makes the lateral magnification $\beta$ of the first positive lens unit Lp1 at the wide angle end large, thereby making the axial beams emerging from the first positive lens unit Lp1 nearly parallel. If the axial beams emerging from the first positive lens unit Lp1 are made nearly parallel, the variation in the incident height of the beams passing through the second positive lens unit Lp2 for focusing is made small, and the variation in spherical aberration with focusing can easily be made small. If the value of |βp1w| falls below the lower limit value in condition (8), the aforementioned advantageous effect cannot be enjoyed so much, leading to a large variation of spherical aberration with focusing, undesirably.

As above, by satisfying condition (8), the variation of spherical aberration with focusing is made small.

It is more preferred that the numerical range of condition (8) be further limited as follows:

$$1.10<|\beta p1w|<4.00 \tag{8a}$$

It is more preferred that the numerical range of condition (8a) be further limited as follows:

$$1.15<|\beta p1w|<2.00 \tag{8b}$$

Condition (9) relates to the combined focal length of the front lens group on the object side of the first positive lens unit Lp1. Condition (10) relates to the combined focal length of the front lens group, the first positive lens unit Lp1 and the second positive lens unit Lp2 for focusing. In conditions (9) and (10), the combined focal lengths are normalized by the focal length of the zoom lens at the wide angle end.

If the negative refractive power of the object side lens group is so low (namely, if the absolute value of the negative refractive power is so low) that the lower limit value in condition (9) or (10) is not reached, the overall size of the zoom lens is likely to be large. This is undesirable. If the negative refractive power of the object side lens group is so high (namely, if the absolute value of the negative refractive power is so high) that the upper limit value in condition (9) or (10) is exceeded, it is difficult to correct aberrations including spherical aberration in the reference state excellently. The reference state is the state in which the zoom lens is focused at infinity.

By satisfying conditions (9) and (10), excellent optical performance can be maintained while keeping the overall size of the zoom lens small. It is more preferred that the numerical range of conditions (9) and (10) be further limited as follows:

$$-3.0<f\!f1/fw<-0.6 \tag{9a}$$

$$-5.0<f\!f2/fw<-0.7 \tag{10a}$$

It is more preferred that the numerical range of conditions (9a) and (10a) be further limited as follows:

$$-2.0<f\!f1/fw<-0.8 \tag{9b}$$

$$-3.0<f\!f2/fw<-1.0 \tag{10b}$$

In the zoom lenses according to the embodiments, the second positive lens unit Lp2 and the third positive lens unit Lp3 shift in such a way that the distance between them is larger at the telephoto end than at the wide angle end. In focusing to the same object distance, the amount of shift of the lens unit for focusing is generally larger at the telephoto end than at the wide angle end.

Therefore, shifting the second positive lens unit Lp2 and the third positive lens unit Lp3 during zooming from the wide angle end to the telephoto end in such a way that the distance between them increases is desirable because a large space allowing driving of the lens unit for focusing at the telephoto end. Moreover, as the second positive lens unit Lp2 for focusing is shifted during zooming, it can contribute to the magnification variation. This helps efficient use of the space in the optical system.

In the zoom lenses according to the embodiments, the first positive lens unit Lp1 and the second positive lens unit Lp2 shift in such a way that the distance between them is smaller at the telephoto end than at the wide angle end. This allows to provide a sufficient space for driving of the second positive lens unit Lp2 during focusing without changing the distance from the first positive lens unit Lp1 to the third positive lens unit Lp3 largely and enables efficient use of the space in the optical system.

In the zoom lenses according to the embodiments, the combined focal length of the lens system on the object side of the second positive lens unit Lp2 for focusing at the wide angle end is negative. Moreover, the combined focal length of the lens system on the object side of the second positive lens unit Lp2 may be negative throughout the entire zoom range. Then, the lateral magnification of the second positive lens unit Lp2 can be designed to be relatively large, and the focus sensitivity can be increased accordingly.

The configuration of each of the zoom lenses according to the embodiments will be described. The numerical data presented below is based on the data of numerical embodiments presented later which will be given in units of millimeters. This applies to all the embodiments. In each of the zoom lenses according to the embodiments, the lens units are arranged in order from the object side to the image side.

First Embodiment

In the following, a zoom lens OL according to a first embodiment of the present invention will be described with reference to FIG. 1. The zoom lens OL according to the first embodiment has a focal length range of 15.4 to 51.0 mm (or an image pickup view angle range of 83.1 to 30.0 degrees). The zoom lens OL according to the first embodiment is composed of seven lens units, which include a first lens unit L1 having a positive refractive power, a second lens unit L2 having a negative refractive power, a third lens unit L3 having a positive refractive power, a fourth lens unit L4 having a positive refractive power, a fifth lens unit L5 having a positive refractive power, a sixth lens unit L6 having a negative refractive power, and a seventh lens unit having a positive refractive power.

In the first embodiment, the third lens unit L3 is the first positive lens unit Lp1 having a positive refractive power, the fourth lens unit L4 is the second positive lens unit Lp2 for focusing having a positive refractive power, and the fifth lens unit L5 is the third positive lens unit Lp3 having a positive refractive power. The second positive lens unit Lp2 consists of one positive lens having a convex surface facing the image side, which has a focal length fp2 of 49.75 mm. The first positive lens unit Lp1 has a focal length fp1 of 88.90 mm. The third positive lens unit Lp3 has a focal length fp3 of 46.95 mm. The front lens group on the object side of the first positive lens unit Lp1 has a negative combined focal length (−13.84 mm) at the wide angle end.

In the zoom lens according to this embodiment, the values of the terms fp2/fw and |βp2w| relating to the second positive lens unit Lp2 specified in conditions (1) and (2) are respectively 3.23 and 4.20.

Second Embodiment

In the following, a zoom lens OL according to a second embodiment of the present invention will be described with reference to FIG. 4. The zoom lens OL according to the second embodiment has a focal length range of 15.4 to 51.0 mm (or an image pickup view angle range of 83.1 to 30.0 degrees). In the zoom lens OL according to the second embodiment, the number of lens units and the signs of the refractive power of the respective lens units are the same as those in the first embodiment.

In the second embodiment, the third lens unit L3 is the first positive lens unit Lp1 having a positive refractive power, the fourth lens unit L4 is the second positive lens unit Lp2 for focusing having a positive refractive power, and the fifth lens unit L5 is the third positive lens unit Lp3 having a positive refractive power. The second positive lens unit Lp2 consists of one positive lens having a convex surface facing the image side, which has a focal length fp2 of 43.38 mm. The first positive lens unit Lp1 has a focal length fp1 of 166.73 mm. The third positive lens unit Lp3 has a focal length fp3 of 56.39 mm. The front lens group on the object side of the first positive lens unit Lp1 has a negative combined focal length (−15.03 mm) at the wide angle end.

In the zoom lens according to this embodiment, the values of the terms fp2/fw and |βp2w| relating to the second positive lens unit Lp2 specified in conditions (1) and (2) are respectively 2.82 and 4.12.

Third Embodiment

In the following, a zoom lens OL according to a third embodiment of the present invention will be described with reference to FIG. 7. The zoom lens OL according to the third embodiment has a focal length range of 15.4 to 45.0 mm (or an image pickup view angle range of 83.1 to 33.8 degrees). The zoom lens OL according to the third embodiment is composed of six lens units, which include a first lens unit L1 having a negative refractive power, a second lens unit L2 having a positive refractive power, a third lens unit L3 having a positive refractive power, a fourth lens unit L4 having a positive refractive power, a fifth lens unit L5 having a negative refractive power, and a sixth lens unit L6 having a positive refractive power.

In the third embodiment, the second lens unit L2 is the first positive lens unit Lp1 having a positive refractive power, the third lens unit L3 is the lens unit for focusing Lp2 having a positive refractive power, and the fourth lens unit L4 is the third positive lens unit Lp3 having a positive refractive power. The second positive lens unit Lp2 consists of one positive lens having a convex surface facing the image side, which has a focal length fp2 of 89.2 mm. The first positive lens unit Lp1 has a focal length fp1 of 386.87 mm. The third positive lens unit Lp3 has a focal length fp3 of 45.36 mm. The first lens unit L1 on the object side of the first positive lens unit Lp1 has a negative combined focal length (−25.28 mm).

In the zoom lens according to this embodiment, the values of the terms fp2/fw and |βp2w| relating to the second positive lens unit Lp2 specified in conditions (1) and (2) are respectively 5.79 and 6.20.

Fourth Embodiment

In the following, a zoom lens OL according to a fourth embodiment of the present invention will be described with reference to FIG. 10. The zoom lens OL according to the fourth embodiment has a focal length range of 18.4 to 292.0 mm (or an image pickup view angle range of 73.2 to 5.4 degrees). In the zoom lens OL according to the fourth embodiment, the number of lenses and the signs of the refractive power of the respective lens units are the same as those in the first embodiment.

In the fourth embodiment, the third lens unit L3 is the first positive lens unit Lp1 having a positive refractive power, the fourth lens unit L4 is the second positive lens unit Lp2 for focusing having a positive refractive power, and the fifth lens unit L5 is the third positive lens unit Lp3 having a positive refractive power. The second positive lens unit Lp2 consists of one positive lens having a convex surface facing the image side, which has a focal length fp2 of 67.17 mm. The first positive lens unit Lp1 has a focal length fp1 of 125.96 mm. The third positive lens unit Lp3 has a focal length fp3 of 37.55 mm. The front lens group on the object side of the first positive lens unit Lp1 has a negative combined focal length (−18.34 mm) at the wide angle end.

In the zoom lens according to this embodiment, the values of the terms fp2/fw and |βp2w| relating to the second positive lens unit Lp2 specified in conditions (1) and (2) are respectively 3.65 and 1.76.

Fifth Embodiment

In the following, a zoom lens OL according to a fifth embodiment of the present invention will be described with reference to FIG. 13. The zoom lens OL according to the fifth embodiment has a focal length range of 18.4 to 292.0 mm (or an image pickup view angle range of 73.2 to 5.4 degrees). In the zoom lens OL according to the fifth embodiment, the number of lenses and the signs of the refractive power of the respective lens units are the same as those in the first embodiment.

In the fifth embodiment, the third lens unit L3 is the first positive lens unit Lp1 having a positive refractive power, the fourth lens unit L4 is the second positive lens unit Lp2 for focusing having a positive refractive power, and the fifth lens unit L5 is the third positive lens unit Lp3 having a positive refractive power. The second positive lens unit Lp2 consists of a positive lens having a convex surface facing the image side and a cemented lens made up of a negative lens and a positive lens. The second positive lens unit Lp2 has a focal length fp2 of 44.96 mm. The first positive lens unit Lp1 has a focal length fp1 of 333.47 mm. The third positive lens unit Lp3 has a focal length fp3 of 64.27 mm. The front lens group on the object side of the first positive lens unit Lp1 has a negative combined focal length (−17.80 mm) at the wide angle end.

In the zoom lens according to this embodiment, the values of the terms fp2/fw and |βp2w| relating to the second positive lens unit Lp2 specified in conditions (1) and (2) are respectively 2.44 and 1.65.

As described above, in the zoom lenses according to the embodiments, the first positive lens unit Lp1 having a positive refractive power is provided on the object side of the zoom lens Lp2 for focusing, the third positive lens unit Lp3 having a positive refractive power is provided on the image side of the second positive lens unit Lp2 for focusing, and these lens units are designed to have appropriate refractive powers. Thus, an appropriate position sensitivity in focusing is achieved. In consequence, variation of aberrations, particularly variation of spherical aberration in focusing from infinity to a short distance is corrected excellently while keeping the size of the zoom lens small. In the zoom lenses according to the embodiments, focusing is performed by shifting the second positive lens unit Lp2, which is relatively small in diameter and lightweight. This helps high speed focusing.

FIG. 16 is a schematic diagram showing the relevant portions of a single-lens reflex camera. The camera shown in FIG. 16 has an image pickup optical system 10 including a zoom lens 1 according to one of the first to fifth embodiments. The image pickup optical system 10 is held by a lens barrel 2 as a holder. The camera includes a camera body 20. The camera body 20 includes a quick-return mirror 3, a focusing screen 4, a penta roof prism 5, and an eyepiece lens 6. The quick-return mirror 3 reflects beams coming from the image pickup optical system 10 upward. The focusing screen 4 is arranged at a location at which an image is formed by the image pickup optical system 10. The penta roof prism 5 converts an inverted image formed on the focusing screen 4 into an erect image. A photographer views the erect image through the eyepiece lens 6.

The camera has a photosensitive surface 7, which is a surface of a solid-state image pickup element (photoelectric conversion element) such as a CCD sensor or CMOS sensor or a silver-halide film that receives an image. When an image is picked up, the quick-return mirror 3 is retracted from the optical path to allow the image pickup optical system 10 to form an image on the photosensitive surface 7.

By using the zoom lens according to the present invention in an image pickup apparatus such as an interchangeable lens for a single-lens reflex camera, high optical performance is achieved. The zoom lens according to the present invention can also be applied to mirrorless single-lens reflex cameras that do not have a quick-return mirror. The zoom lens according to the present invention can be applied to various optical apparatuses, such as telescopes, binoculars, copying machines, and projectors, as well as digital cameras, video cameras, and film cameras.

While preferred embodiments of the present invention have been described in the foregoing, the present invention is not limited to the above-described embodiments. Various modifications and changes can be made thereto without departing from the essence of the present invention.

In the following specific numerical data of the zoom lenses according to the first to fifth embodiment will be presented. In the numerical data, the surface number i is counted from the object side. In the numerical data, Ri is the curvature radius (mm) of the i-th surface, Di is the distance between the i-th surface and the (i+1)th surface, Ndi and νdi are the refractive index and the Abbe number of the medium between the i-th surface and the (i+1)th surface respectively, and BF is the back focus. The overall lens length is the distance from the first lens surface to the image plane.

In the numerical data, aspheric lens surfaces are indicated by asterisk * suffixed to their surface numbers. The aspheric shape of an aspheric surface is represented by the following equation:

$$X(h) = \frac{(1/r)h^2}{1 + \sqrt{1 - (1+K)(h/r)^2}} + Bh^4 + Ch^6 + Dh^8 + Eh^{10} \ldots,$$

where X is the displacement along the optical axis from the surface vertex, h is the height from the optical axis in directions perpendicular to the optical axis, r is the paraxial curvature radius, K is a conic constant, and B, C, D, E, ... are aspheric coefficients of the respective orders. In the numerical data of the aspheric coefficients, the expression "E±XX" stands for "×10$^{\pm XX}$".

Values relating to the conditions described in the foregoing are presented in Table 1 for each of the embodiments. Values of the terms in conditions (1) to (10) described in the foregoing are presented in Table 2 for each of the embodiments.

First Embodiment

| Lengths in the following data are in millimeters. | | | | |
|---|---|---|---|---|
| Surface number i | Ri | Di | Ndi | νdi | Effective Diameter |
| 1 | 454.147 | 1.60 | 1.84666 | 23.9 | 53.20 |
| 2 | 69.130 | 6.19 | 1.77250 | 49.6 | 49.44 |
| 3 | −1518.967 | 0.15 | | | 48.45 |
| 4 | 36.349 | 5.21 | 1.77250 | 49.6 | 43.09 |
| 5 | 71.221 | (variable) | | | 41.8 |
| 6 | 32.401 | 1.10 | 1.88300 | 40.8 | 24.89 |
| 7 | 10.216 | 6.47 | | | 17.78 |
| 8* | −36.665 | 0.80 | 1.85135 | 40.1 | 17.53 |
| 9* | 22.837 | 0.16 | | | 16.76 |
| 10 | 23.456 | 5.06 | 1.71736 | 29.5 | 16.77 |
| 11 | −23.422 | 0.89 | | | 16.18 |
| 12 | −16.412 | 0.80 | 1.88300 | 40.8 | 15.73 |
| 13 | 83.694 | 2.54 | 1.85478 | 24.8 | 15.77 |
| 14 | −38.102 | (variable) | | | 15.79 |
| 15 | −2864.166 | 1.64 | 1.48749 | 70.2 | 14.13 |
| 16 | −42.698 | (variable) | | | 14.45 |
| 17 | 74.351 | 2.08 | 1.66672 | 48.3 | 15.38 |
| 18 | −59.215 | (variable) | | | 15.49 |
| 19(stop) | ∞ | 0.87 | | | 15.39 |
| 20 | 36.280 | 4.43 | 1.49700 | 81.5 | 15.35 |
| 21 | −18.962 | 0.80 | 1.85478 | 24.8 | 15.03 |
| 22 | −31.970 | (variable) | | | 15.08 |
| 23 | −35.606 | 3.01 | 1.84666 | 23.9 | 13.33 |
| 24 | −15.641 | 0.76 | 1.80400 | 46.6 | 13.28 |
| 25 | 64.483 | (variable) | | | 13.17 |
| 26* | 98.271 | 3.13 | 1.58313 | 59.4 | 18.17 |
| 27 | −30.654 | 0.15 | | | 18.74 |
| 28 | 174.819 | 0.80 | 1.85478 | 24.8 | 19.34 |
| 29 | 23.473 | 5.21 | 1.59522 | 67.7 | 19.65 |
| 30 | −44.209 | (variable) | | | 20.21 |
| IP | ∞ | | | | |

IP: image plane

-continued

Lengths in the following data are in millimeters.

Aspheric Surface Data

| | conic constant K | 4th order coefficient B | 6th order coefficient C | 8th order coefficient D | 10th order coefficient E | 12th order coefficient F |
|---|---|---|---|---|---|---|
| 8th | 0.0000E+00 | 5.7939E−06 | 1.7263E−07 | −5.0882E−09 | 3.3173E−11 | 0.0000E+00 |
| 9th | 0.0000E+00 | −3.4964E−05 | 1.8797E−07 | −6.4153E−09 | 3.9135E−11 | 0.0000E+00 |
| 26th | 0.0000E+00 | −1.3274E−05 | 3.6083E−08 | −1.8284E−10 | 2.8850E−13 | 0.0000E+00 |

Various Data

| | Wide Angle end | Intermediate | Telephoto end |
|---|---|---|---|
| Focal Length | 15.40 | 20.64 | 51.00 |
| Fno | 2.80 | 3.00 | 4.30 |
| ω | 41.57 | 33.49 | 14.99 |
| Image Height | 13.66 | 13.66 | 13.66 |
| OLL | 119.90 | 124.20 | 148.63 |
| BF | 35.50 | 38.23 | 49.86 |
| Entrance PP | 23.18 | 32.77 | 81.71 |
| Exit PP | −61.45 | −50.93 | −36.09 |
| Front PP | 36.13 | 48.64 | 102.45 |
| Rear PP | 20.10 | 17.59 | −1.14 |

Entrance PP: entrance pupil position
Exit PP: exit pupil position
Front PP: front principal point position
Rear PP: rear principal point position Variable Distance

| Surface number i | Wide Angle end | Intermediate | Telephoto end |
|---|---|---|---|
| 5 | 1.00 | 6.73 | 25.02 |
| 14 | 11.56 | 7.82 | 1.50 |
| 16 | 2.06 | 2.13 | 0.80 |
| 18 | 3.35 | 3.27 | 4.60 |
| 22 | 2.18 | 4.84 | 11.99 |
| 25 | 10.40 | 7.31 | 1.00 |
| 30 | 35.50 | 38.23 | 49.86 |

Lens Unit Data

| Unit | Leading Surface | Focal Length | Unit Length | Front PP | Rear PP |
|---|---|---|---|---|---|
| 1 | 1 | 80.82 | 13.15 | 1.57 | −5.70 |
| 2 | 6 | −10.47 | 17.82 | 2.54 | −10.47 |
| 3 | 15 | 88.90 | 1.64 | 1.12 | 0.02 |
| 4 | 17 | 49.75 | 2.08 | 0.70 | −0.56 |
| 5 | 19 | 46.95 | 6.10 | 2.54 | −1.81 |
| 6 | 23 | −29.41 | 3.77 | 0.62 | −1.40 |
| 7 | 26 | 32.20 | 9.29 | 3.13 | −2.89 |

Single Lens Data

| Lens | Leading Surface | Focal Length |
|---|---|---|
| 1 | 1 | −96.490 |
| 2 | 2 | 85.740 |
| 3 | 4 | 90.230 |
| 4 | 6 | −17.300 |
| 5 | 8 | −16.430 |
| 6 | 10 | 17.110 |
| 7 | 12 | −15.480 |
| 8 | 13 | 30.930 |
| 9 | 15 | 88.900 |
| 10 | 17 | 49.750 |
| 11 | 20 | 25.740 |
| 12 | 21 | −56.110 |
| 13 | 23 | 30.810 |
| 14 | 24 | −15.590 |
| 15 | 26 | 40.430 |
| 16 | 28 | −31.800 |
| 17 | 29 | 26.520 |

Second Embodiment

| | Lengths in the following data are in millimeters. | | | | |
|---|---|---|---|---|---|
| Surface number i | Ri | Di | Ndi | νdi | Effective Diameter |
| 1 | 347.637 | 1.60 | 1.84666 | 23.9 | 52.96 |
| 2 | 69.242 | 5.74 | 1.77250 | 49.6 | 48.98 |
| 3 | 2752.474 | 0.15 | | | 48.53 |
| 4 | 43.073 | 5.66 | 1.77250 | 49.6 | 44.81 |
| 5 | 106.101 | (variable) | | | 43.44 |
| 6* | 69.081 | 1.10 | 1.85135 | 40.1 | 26.26 |
| 7 | 12.290 | 5.98 | | | 19.15 |
| 8 | −38.888 | 0.80 | 1.88300 | 40.8 | 18.83 |
| 9 | 28.343 | 0.15 | | | 17.74 |
| 10 | 23.883 | 5.00 | 1.71736 | 29.5 | 17.72 |
| 11 | −27.151 | 1.05 | | | 17.06 |
| 12 | −17.464 | 0.80 | 1.88300 | 40.8 | 16.59 |
| 13 | 38.585 | 3.16 | 1.85478 | 24.8 | 16.56 |
| 14 | −39.422 | (variable) | | | 16.56 |
| 15 | 210.267 | 1.92 | 1.60311 | 60.6 | 14.37 |
| 16 | −192.057 | (variable) | | | 14.76 |
| 17 | 64.744 | 2.17 | 1.69680 | 55.5 | 15.45 |
| 18 | −55.924 | (variable) | | | 15.56 |
| 19(stop) | ∞ | 0.90 | | | 15.44 |
| 20 | 32.336 | 4.07 | 1.49700 | 81.5 | 15.38 |
| 21 | −22.418 | 0.80 | 2.00069 | 25.5 | 15.04 |
| 22 | −40.238 | (variable) | | | 15.10 |
| 23 | −36.749 | 2.97 | 1.90366 | 31.3 | 13.70 |
| 24 | −12.238 | 0.76 | 1.83481 | 42.7 | 13.74 |
| 25 | 182.277 | (variable) | | | 13.66 |
| 26* | −160.953 | 1.95 | 1.58313 | 59.4 | 16.47 |
| 27 | −57.818 | 0.15 | | | 17.28 |
| 28 | 132.067 | 0.80 | 1.85478 | 24.8 | 17.96 |
| 29 | 28.303 | 5.37 | 1.59522 | 67.7 | 18.48 |
| 30 | −26.136 | (variable) | | | 19.32 |
| IP | ∞ | | | | |

IP: image plane

Aspheric Surface Data

| | conic constant K | 4th order coefficient B | 6th order coefficient C | 8th order coefficient D | 10th order coefficient E | 12th order coefficient F |
|---|---|---|---|---|---|---|
| 6th | 0.0000E+00 | 1.9037E−05 | −5.9362E−08 | 3.8915E−10 | −1.7668E−12 | 4.4706E−15 |
| 26th | 0.0000E+00 | −2.1803E−05 | 1.4645E−08 | −5.5371E−10 | 4.0638E−12 | 0.0000E+00 |

Various Data

| | Wide Angle end | Intermediate | Telephoto end |
|---|---|---|---|
| Focal Length | 15.40 | 20.00 | 51.00 |
| Fno | 2.80 | 3.00 | 4.14 |
| ω | 41.57 | 34.33 | 14.99 |
| Image Height | 13.66 | 13.66 | 13.66 |
| OLL | 121.12 | 123.42 | 151.12 |
| BF | 35.50 | 39.78 | 55.98 |
| Entrance PP | 23.77 | 29.74 | 82.16 |
| Exit PP | −57.37 | −48.32 | −34.75 |
| Front PP | 36.62 | 45.20 | 104.49 |
| Rear PP | 20.10 | 19.78 | 4.98 |

Entrance PP: entrance pupil position
Exit PP: exit pupil position
Front PP: front principal point position
Rear PP: rear principal point position

Variable Distance

| Surface number i | Wide Angle end | Intermediate | Telephoto end |
|---|---|---|---|
| 5 | 1.25 | 5.14 | 25.79 |
| 14 | 14.22 | 9.37 | 1.50 |
| 16 | 1.40 | 1.47 | 0.15 |
| 18 | 2.78 | 2.72 | 4.04 |
| 22 | 2.43 | 4.54 | 9.61 |
| 25 | 10.48 | 7.35 | 1.00 |
| 30 | 35.50 | 39.78 | 55.98 |

-continued

| Lengths in the following data are in millimeters. | | | | | |
|---|---|---|---|---|---|
| Lens Unit Data | | | | | |
| Unit | Leading Surface | Focal Length | Unit Length | Front PP | Rear PP |
| 1 | 1 | 82.58 | 13.15 | 1.80 | −5.53 |
| 2 | 6 | −11.34 | 18.04 | 2.17 | −10.95 |
| 3 | 15 | 166.73 | 1.92 | 0.63 | −0.57 |
| 4 | 17 | 43.38 | 2.17 | 0.69 | −0.60 |
| 5 | 19 | 56.39 | 5.76 | 1.86 | −2.22 |
| 6 | 23 | −42.48 | 3.73 | 0.01 | −1.96 |
| 7 | 26 | 38.05 | 8.27 | 4.65 | −0.57 |

| Single Lens Data | | |
|---|---|---|
| Lens | Leading Surface | Focal Length |
| 1 | 1 | −102.390 |
| 2 | 2 | 91.860 |
| 3 | 4 | 90.330 |
| 4 | 6 | −17.720 |
| 5 | 8 | −18.460 |
| 6 | 10 | 18.470 |
| 7 | 12 | −13.530 |
| 8 | 13 | 23.250 |
| 9 | 15 | 166.730 |
| 10 | 17 | 43.380 |
| 11 | 20 | 27.310 |
| 12 | 21 | −51.750 |
| 13 | 23 | 19.200 |
| 14 | 24 | −13.710 |
| 15 | 26 | 153.670 |
| 16 | 28 | −42.290 |
| 17 | 29 | 23.700 |

Third Embodiment

| Lengths in the following data are in millimeters. | | | | | |
|---|---|---|---|---|---|
| Surface number i | Ri | Di | Ndi | vdi | Effective Diameter |
| 1 | 36.430 | 1.80 | 1.83481 | 42.7 | 38.24 |
| 2 | 16.039 | 11.06 | | | 29.23 |
| 3* | −78.875 | 1.50 | 1.58313 | 59.4 | 29.12 |
| 4* | 24.655 | 2.56 | | | 28.99 |
| 5 | 55.486 | 3.72 | 1.84666 | 23.9 | 29.27 |
| 6 | −212.694 | (variable) | | | 29.10 |
| 7 | 51.175 | 1.80 | 1.48749 | 70.2 | 18.04 |
| 8 | 69.423 | (variable) | | | 18.09 |
| 9 | 49.920 | 1.99 | 1.51633 | 64.1 | 18.30 |
| 10 | −587.428 | (variable) | | | 18.29 |
| 11(stop) | ∞ | 1.70 | | | 18.75 |
| 12 | 48.177 | 1.78 | 1.49700 | 81.5 | 19.17 |
| 13 | 226.365 | 0.15 | | | 19.14 |
| 14 | 42.908 | 4.65 | 1.60311 | 60.6 | 19.14 |
| 15 | −28.003 | 0.80 | 1.84666 | 23.9 | 18.80 |
| 16 | −96.315 | (variable) | | | 18.69 |
| 17 | −104.289 | 2.88 | 1.84666 | 23.9 | 15.98 |
| 18 | −18.376 | 1.00 | 1.83400 | 37.2 | 15.98 |
| 19 | 55.164 | (variable) | | | 16.38 |
| 20* | 111.820 | 3.32 | 1.58313 | 59.4 | 18.28 |
| 21 | −26.080 | 0.15 | | | 18.72 |
| 22 | −585.770 | 1.74 | 1.48749 | 70.2 | 18.89 |
| 23 | −56.113 | 1.00 | 1.84666 | 23.9 | 18.96 |
| 24 | ∞ | (variable) | | | 19.18 |
| IP | ∞ | | | | |

IP: image plane

Lengths in the following data are in millimeters.

Aspheric Surface Data

|  | conic constant K | 4th order coefficient B | 6th order coefficient C | 8th order coefficient D | 10th order coefficient E | 12th order coefficient F |
| --- | --- | --- | --- | --- | --- | --- |
| 3rd | 0.0000E+00 | 1.0450E−05 | −3.1988E−08 | −8.3239E−11 | 7.6459E−13 | −1.5120E−15 |
| 4th | 0.0000E+00 | −1.9596E−05 | −3.7301E−08 | −3.6486E−10 | 2.1968E−12 | −5.0180E−15 |
| 20th | 0.0000E+00 | −1.9436E−05 | −2.0780E−08 | 8.7157E−10 | −1.2335E−11 | 5.7438E−14 |

Various Data

|  | Wide Angle end | Intermediate | Telephoto end |
| --- | --- | --- | --- |
| Focal Length | 15.40 | 25.00 | 45.00 |
| Fno | 2.80 | 3.27 | 4.50 |
| ω | 41.57 | 28.65 | 16.89 |
| Image Height | 13.66 | 13.66 | 13.66 |
| OLL | 143.50 | 127.74 | 130.57 |
| BF | 35.50 | 44.00 | 61.03 |
| Entrance PP | 21.52 | 18.94 | 16.44 |
| Exit PP | −47.76 | −44.75 | −33.27 |
| Front PP | 34.07 | 36.90 | 39.96 |
| Rear PP | 20.10 | 19.00 | 16.03 |

Entrance PP: entrance pupil position
Exit PP: exit pupil position
Front PP: front principal point position
Rear PP: rear principal point position

Variable Distance

| Surface number i | Wide Angle end | Intermediate | Telephoto end |
| --- | --- | --- | --- |
| 6 | 41.27 | 16.07 | 1.50 |
| 8 | 1.00 | 2.21 | 0.50 |
| 10 | 6.83 | 5.61 | 7.33 |
| 16 | 1.51 | 6.22 | 14.59 |
| 19 | 13.80 | 10.02 | 2.02 |
| 24 | 35.50 | 44.00 | 61.03 |

Lens Unit Data

| Unit | Leading Surface | Focal Length | Unit Length | Front PP | Rear PP |
| --- | --- | --- | --- | --- | --- |
| 1 | 1 | −25.28 | 20.64 | 3.10 | −14.94 |
| 2 | 7 | 386.87 | 1.80 | −3.29 | −4.46 |
| 3 | 9 | 89.20 | 1.99 | 0.10 | −1.21 |
| 4 | 11 | 45.36 | 9.08 | 2.63 | −3.78 |
| 5 | 17 | −43.88 | 3.88 | 1.35 | −0.73 |
| 6 | 20 | 49.01 | 6.21 | 1.15 | −2.79 |

Single Lens Data

| Lens | Leading Surface | Focal Length |
| --- | --- | --- |
| 1 | 1 | −35.760 |
| 2 | 3 | −32.040 |
| 3 | 5 | 52.310 |
| 4 | 7 | 386.870 |
| 5 | 9 | 89.200 |
| 6 | 12 | 122.740 |
| 7 | 14 | 28.810 |
| 8 | 15 | −46.880 |
| 9 | 17 | 25.950 |
| 10 | 18 | −16.430 |
| 11 | 20 | 36.590 |
| 12 | 22 | 127.160 |
| 13 | 23 | −66.270 |

Fourth Embodiment

| | Lengths in the following data are in millimeters. | | | | |
|---|---|---|---|---|---|
| Surface number i | Ri | Di | Ndi | νdi | Effective Diameter |
| 1 | 141.789 | 1.80 | 1.91082 | 35.3 | 53.35 |
| 2 | 60.659 | 8.81 | 1.49700 | 81.5 | 52.16 |
| 3 | −489.812 | 0.15 | | | 52.08 |
| 4 | 56.310 | 6.66 | 1.59522 | 67.7 | 51.32 |
| 5 | 297.753 | (variable) | | | 50.64 |
| 6* | 146.922 | 1.50 | 1.85135 | 40.1 | 28.37 |
| 7 | 18.515 | 5.00 | | | 22.91 |
| 8 | −78.718 | 1.20 | 1.72916 | 54.7 | 22.73 |
| 9 | 22.009 | 4.82 | 1.85478 | 24.8 | 21.22 |
| 10 | −128.226 | 0.61 | | | 20.60 |
| 11 | −64.644 | 1.00 | 1.76385 | 48.5 | 20.41 |
| 12 | 26.205 | 1.99 | 1.85478 | 24.8 | 19.25 |
| 13 | 51.043 | (variable) | | | 18.90 |
| 14 | 36.221 | 1.80 | 1.74000 | 28.3 | 18.10 |
| 15 | 57.990 | 1.86 | | | 18.22 |
| 16(stop) | ∞ | (variable) | | | 18.68 |
| 17 | 4817.464 | 1.99 | 1.72916 | 54.7 | 18.76 |
| 18 | −49.475 | (variable) | | | 19.00 |
| 19 | 29.514 | 4.87 | 1.49700 | 81.5 | 20.72 |
| 20 | −40.710 | 1.00 | 2.00069 | 25.5 | 20.42 |
| 21 | −206.017 | 0.15 | | | 20.43 |
| 22 | 35.561 | 3.27 | 1.48749 | 70.2 | 20.25 |
| 23 | −108.442 | (variable) | | | 19.91 |
| 24 | −77.718 | 1.74 | 1.76182 | 26.5 | 15.03 |
| 25 | −27.493 | 1.00 | 1.85135 | 40.1 | 15.03 |
| 26* | 51.684 | 2.57 | | | 15.15 |
| 27 | −23.204 | 1.00 | 1.88300 | 40.8 | 15.39 |
| 28 | −44.058 | (variable) | | | 16.18 |
| 29* | −693.257 | 4.59 | 1.58313 | 59.4 | 22.30 |
| 30 | −21.723 | 0.15 | | | 22.96 |
| 31 | 89.255 | 6.83 | 1.48749 | 70.2 | 22.89 |
| 32 | −20.637 | 1.00 | 2.00069 | 25.5 | 22.64 |
| 33 | −40.382 | 0.15 | | | 23.32 |
| 34 | 167.649 | 7.28 | 1.80518 | 25.4 | 23.14 |
| 35 | −18.302 | 1.00 | 1.88300 | 40.8 | 22.83 |
| 36 | 102.547 | (variable) | | | 22.64 |
| IP | ∞ | | | | |

IP: image plane

Aspheric Surface Data

| | conic constant K | 4th order coefficient B | 6th order coefficient C | 8th order coefficient D | 10th order coefficient E | 12th order coefficient F |
|---|---|---|---|---|---|---|
| 6th | 0.0000E+00 | 1.8977E−06 | −6.1390E−09 | 7.3862E−12 | −1.1263E−14 | −4.4518E−18 |
| 26th | 0.0000E+00 | −6.4079E−06 | 6.0301E−09 | −8.1907E−11 | 5.7961E−13 | 0.0000E+00 |
| 29th | 0.0000E+00 | −9.9316E−06 | 1.7361E−08 | −9.9229E−11 | 3.7909E−13 | 0.0000E+00 |

Various Data

| | Wide Angle end | Intermediate | Telephoto end |
|---|---|---|---|
| Focal Length | 18.40 | 55.00 | 292.00 |
| Fno | 3.29 | 4.87 | 6.30 |
| ω | 36.59 | 13.95 | 2.68 |
| Image Height | 13.66 | 13.66 | 13.66 |
| OLL | 168.30 | 195.93 | 248.31 |
| BF | 36.09 | 60.42 | 80.44 |
| Entrance PP | 31.54 | 78.32 | 351.35 |
| Exit PP | −91.94 | −63.54 | −44.86 |
| Front PP | 47.30 | 108.91 | −37.13 |
| Rear PP | 17.69 | 5.42 | −211.56 |

Entrance PP: entrance pupil position
Exit PP: exit pupil position
Front PP: front principal point position
Rear PP: rear principal point position -continued

| Lengths in the following data are in millimeters. | | | |
|---|---|---|---|
| Variable Distance | | | |
| Surface number i | Wide Angle end | Intermediate | Telephoto end |
| 5 | 1.00 | 25.89 | 66.66 |
| 13 | 31.51 | 9.91 | 1.50 |
| 16 | 8.96 | 9.89 | 0.19 |
| 18 | 3.99 | 3.06 | 12.76 |
| 23 | 1.68 | 6.09 | 9.97 |
| 28 | 9.29 | 4.88 | 1.00 |
| 36 | 36.09 | 60.42 | 80.44 |

| Lens Unit Data | | | | | |
|---|---|---|---|---|---|
| Unit | Leading Surface | Focal Length | Unit Length | Front PP | Rear PP |
| 1 | 1 | 107.72 | 17.42 | 5.70 | −5.46 |
| 2 | 6 | −14.17 | 16.12 | 3.86 | −6.31 |
| 3 | 14 | 125.96 | 3.66 | −1.66 | −4.52 |
| 4 | 17 | 67.17 | 1.99 | 1.14 | −0.01 |
| 5 | 19 | 37.55 | 9.29 | 2.22 | −4.07 |
| 6 | 24 | −20.50 | 6.31 | 1.86 | −2.69 |
| 7 | 29 | 37.74 | 21.00 | −0.18 | −11.92 |

| Single Lens Data | | |
|---|---|---|
| Lens | Leading Surface | Focal Length |
| 1 | 1 | −117.630 |
| 2 | 2 | 109.180 |
| 3 | 4 | 115.480 |
| 4 | 6 | −25.020 |
| 5 | 8 | −23.470 |
| 6 | 9 | 22.310 |
| 7 | 11 | −24.300 |
| 8 | 12 | 60.760 |
| 9 | 14 | 125.960 |
| 10 | 17 | 67.170 |
| 11 | 19 | 35.240 |
| 12 | 20 | −50.850 |
| 13 | 22 | 55.340 |
| 14 | 24 | 55.020 |
| 15 | 25 | −20.960 |
| 16 | 27 | −56.790 |
| 17 | 29 | 38.360 |
| 18 | 31 | 35.100 |
| 19 | 32 | −43.270 |
| 20 | 34 | 20.860 |
| 21 | 35 | −17.520 |

Fifth Embodiment

| Lengths in the following data are in millimeters. | | | | |
|---|---|---|---|---|
| Surface number i | Ri | Di | Ndi | vdi | Effective Diameter |
| 1 | 151.927 | 1.80 | 1.91082 | 35.3 | 52.50 |
| 2 | 65.285 | 7.91 | 1.49700 | 81.5 | 51.27 |
| 3 | −345.810 | 0.15 | | | 51.20 |
| 4 | 60.867 | 6.39 | 1.59522 | 67.7 | 50.31 |
| 5 | 530.125 | (variable) | | | 49.68 |
| 6 | 68.210 | 1.50 | 1.88300 | 40.8 | 28.21 |
| 7 | 17.623 | 6.04 | | | 22.64 |
| 8* | −30.392 | 1.20 | 1.76802 | 49.2 | 22.39 |
| 9* | 46.449 | 0.15 | | | 21.20 |
| 10 | 27.476 | 5.70 | 1.85478 | 24.8 | 21.25 |
| 11 | −33.070 | 0.50 | | | 20.60 |
| 12 | −28.200 | 1.00 | 1.83481 | 42.7 | 20.06 |
| 13 | 35.387 | 1.55 | 1.85478 | 24.8 | 18.89 |
| 14 | 63.479 | (variable) | | | 18.62 |

-continued

| Lengths in the following data are in millimeters. | | | | | |
|---|---|---|---|---|---|
| 15(stop) | ∞ | 1.70 | | | 17.44 |
| 16 | 38.453 | 1.70 | 1.48749 | 70.2 | 19.01 |
| 17 | 49.638 | (variable) | | | 19.27 |
| 18 | 73.926 | 2.23 | 1.77250 | 49.6 | 19.60 |
| 19 | −106.040 | 0.15 | | | 19.76 |
| 20 | 36.882 | 1.20 | 1.90366 | 31.3 | 19.97 |
| 21 | 17.466 | 4.32 | 1.60311 | 60.6 | 19.39 |
| 22 | 177.127 | (variable) | | | 19.38 |
| 23 | 24.199 | 1.00 | 1.80400 | 46.6 | 20.09 |
| 24 | 21.967 | 5.56 | 1.49700 | 81.5 | 19.67 |
| 25 | −35.718 | 0.15 | | | 19.20 |
| 26 | −44.917 | 1.00 | 1.72916 | 54.7 | 18.87 |
| 27 | 340.143 | (variable) | | | 18.47 |
| 28 | −60.815 | 2.26 | 1.84666 | 23.9 | 15.64 |
| 29 | −20.891 | 1.20 | 1.85135 | 40.1 | 15.77 |
| 30* | 53.440 | (variable) | | | 16.11 |
| 31* | 56.232 | 4.86 | 1.58313 | 59.4 | 21.31 |
| 32 | −24.181 | 0.15 | | | 21.72 |
| 33 | −77.367 | 5.05 | 1.80518 | 25.4 | 21.41 |
| 34 | −18.461 | 1.20 | 2.00069 | 25.5 | 21.50 |
| 35 | −111.602 | (variable) | | | 22.20 |
| IP | ∞ | | | | |

IP: image plane

Aspheric Surface Data

| | conic constant K | 4th order coefficient B | 6th order coefficient C | 8th order coefficient D | 10th order coefficient E |
|---|---|---|---|---|---|
| 8th | 0.0000E+00 | 5.8661E−05 | −4.5950E−07 | 2.6067E−09 | −6.8555E−12 |
| 9th | 0.0000E+00 | 6.3903E−05 | −5.3970E−07 | 3.7679E−09 | −1.2080E−11 |
| 30th | 0.0000E+00 | −6.2234E−06 | −1.5865E−08 | 5.3573E−10 | −3.8061E−12 |
| 31st | 0.0000E+00 | −2.4099E−05 | 1.0205E−08 | −5.2224E−11 | −2.3477E−14 |

Various Data

| | Wide Angle end | Intermediate | Telephoto end |
|---|---|---|---|
| Focal Length | 18.40 | 55.00 | 292.00 |
| Fno | 3.44 | 5.10 | 6.30 |
| ω | 36.59 | 13.95 | 2.68 |
| Image Height | 13.66 | 13.66 | 13.66 |
| OLL | 163.34 | 190.39 | 248.30 |
| BE | 35.50 | 70.35 | 90.77 |
| Entrance PP | 31.30 | 61.25 | 339.84 |
| Exit PP | −96.22 | −63.71 | −49.66 |
| Front PP | 47.13 | 93.69 | 24.65 |
| Rear PP | 17.10 | 15.35 | −201.23 |

Entrance PP: entrance pupil position
Exit PP: exit pupil position
Front PP: front principal point position
Rear PP: rear principal point position Variable Distance

| Surface number i | Wide Angle end | Intermediate | Telephoto end |
|---|---|---|---|
| 5 | 1.00 | 19.56 | 63.68 |
| 14 | 34.68 | 8.32 | 1.70 |
| 17 | 1.16 | 7.68 | 1.00 |
| 22 | 10.46 | 3.95 | 10.62 |
| 27 | 1.83 | 9.09 | 11.67 |
| 30 | 11.11 | 3.85 | 1.27 |
| 35 | 35.50 | 70.35 | 90.77 |

Lens Unit Data

| Unit | Leading Surface | Focal Length | Unit Length | Front PP | Rear PP |
|---|---|---|---|---|---|
| 1 | 1 | 102.12 | 16.24 | 5.54 | −4.87 |
| 2 | 6 | −13.63 | 17.64 | 4.45 | −6.79 |
| 3 | 15 | 333.47 | 3.40 | −2.04 | −4.83 |
| 4 | 18 | 44.96 | 7.89 | −0.31 | −4.95 |
| 5 | 23 | 64.27 | 7.71 | −1.98 | −6.80 |

-continued

| Lengths in the following data are in millimeters. | | | | | |
|---|---|---|---|---|---|
| 6 | 28 | −32.79 | 3.46 | 0.99 | −0.86 |
| 7 | 31 | 45.12 | 11.26 | 1.65 | −5.04 |

| Single Lens Data | | |
|---|---|---|
| Lens | Leading Surface | Focal Length |
| 1 | 1 | −126.940 |
| 2 | 2 | 111.210 |
| 3 | 4 | 114.940 |
| 4 | 6 | −27.290 |
| 5 | 8 | −23.760 |
| 6 | 10 | 18.350 |
| 7 | 12 | −18.670 |
| 8 | 13 | 91.230 |
| 9 | 16 | 333.470 |
| 10 | 18 | 56.690 |
| 11 | 20 | −37.820 |
| 12 | 21 | 31.800 |
| 13 | 23 | −370.120 |
| 14 | 24 | 28.270 |
| 15 | 26 | −54.360 |
| 16 | 28 | 36.630 |
| 17 | 29 | −17.510 |
| 18 | 31 | 29.660 |
| 19 | 33 | 29.000 |
| 20 | 34 | −22.250 |

TABLE 1

| | Embodiment | | | | |
|---|---|---|---|---|---|
| | 1 | 2 | 3 | 4 | 5 |
| ff1 | −13.84 | −15.03 | −25.28 | −18.34 | −17.80 |
| ff2 | −23.01 | −19.65 | −31.69 | −31.56 | −21.35 |
| fp1 | 88.90 | 166.73 | 386.87 | 125.96 | 333.47 |
| fp2 | 49.75 | 43.38 | 89.20 | 67.17 | 44.96 |
| fp3 | 46.95 | 56.39 | 45.36 | 37.55 | 64.27 |
| fpw | 21.21 | 23.01 | 31.10 | 24.30 | 28.61 |
| frw | 78.00 | 75.12 | 203.92 | −142.47 | 1153.36 |
| βp1w | 1.66 | 1.31 | 1.25 | 1.72 | 1.20 |
| βp1t | 1.42 | 1.20 | 1.11 | 1.34 | 1.11 |
| βp2w | −4.20 | −4.12 | −6.20 | −1.76 | −1.65 |
| βp2t | 4.74 | 5.06 | 2.15 | 3.56 | 11.29 |
| fw | 21.33 | 23.20 | 31.20 | 25.84 | 28.64 |

TABLE 2

| | | Embodiment | | | | |
|---|---|---|---|---|---|---|
| Condition | | 1 | 2 | 3 | 4 | 5 |
| (1) | fp2/fw | 3.23 | 2.82 | 5.79 | 3.65 | 2.44 |
| (2) | \|βp2w\| | 4.20 | 4.12 | 6.20 | 1.76 | 1.65 |
| (3) | fp2/fp3 | 1.06 | 0.77 | 1.97 | 1.79 | 0.70 |
| (4) | fw/fpw | 0.73 | 0.67 | 0.50 | 0.76 | 0.64 |
| (5) | \|frw/fpw\| | 3.68 | 3.26 | 6.56 | 5.86 | 40.32 |
| (6) | \|βp2t\| | 4.74 | 5.06 | 2.15 | 3.56 | 11.29 |
| (7) | fp1/fw | 5.77 | 10.83 | 25.12 | 6.85 | 18.12 |
| (8) | \|βp1w\| | 1.66 | 1.31 | 1.25 | 1.72 | 1.20 |
| (9) | ff1/fw | −0.90 | −0.98 | −1.64 | −1.00 | −0.97 |
| (10) | ff2/fw | −1.49 | −1.28 | −2.06 | −1.72 | −1.16 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-108317, filed on May 28, 2015, which is hereby incorporated by reference herein in its entirety.

What is claimed is:

1. A zoom lens comprising a first positive lens unit having a positive refractive power, a second positive lens unit having a positive refractive power arranged adjacent to the first positive lens unit on its image side, and a third positive lens unit having a positive refractive power arranged adjacent to the second positive lens unit on its image side, the distances between the adjacent lens units varying during at least one of zooming and focusing, wherein
   the zoom lens includes a front lens group including at least one lens unit provided on the object side of the first positive lens unit,
   the combined focal length of the front lens group at the wide angle end is negative,
   the second positive lens unit moves along the optical axis toward the image side during focusing from infinity to a short distance, and
   the zoom lens satisfies the following conditions:

$$1.5 < fp2/fw < 10.0 \text{ and}$$

$$1.0 < |\beta p2w|,$$

where fp2 is a focal length of the second positive lens unit, fw is a focal length of the zoom lens at the wide angle end, and βp2w is a lateral magnification of the second positive lens unit in a state in which the zoom lens is focused at infinity at the wide angle end.

2. A zoom lens according to claim 1, wherein the zoom lens satisfies the following condition:

$$0.55 < fp2/fp3 < 5.00,$$

where fp3 is the focal length of the third positive lens unit.

3. A zoom lens according to claim 1, wherein the zoom lens satisfies the following condition:

$$0.2 < fw/fpw < 1.0,$$

where fpw is a focal length of a combined lens system composed of the first positive lens unit, the second positive lens unit, and the third positive lens unit at the wide angle end.

4. A zoom lens according to claim 1, further comprising a rear lens group including at least one lens unit on the image side of the third positive lens unit, and the zoom lens satisfies the following condition:

$$1.0<|frw/fpw|,$$

where frw is a focal length of the rear lens group at the wide angle end, fpw is a focal length of a combined lens system composed of the first positive lens unit, the second positive lens unit, and the third positive lens unit at the wide angle end.

5. A zoom lens according to claim 1, wherein the zoom lens satisfies the following condition:

$$1.0<|\beta p2t|,$$

where βp2t is a lateral magnification of the second positive lens unit in the state in which the zoom lens is focused at infinity at the telephoto end.

6. A zoom lens according to claim 1, wherein during zooming, the second positive lens unit and the third positive lens unit move in such a way that a distance between the second positive lens unit and the third positive lens unit on the optical axis is larger at the telephoto end than at the wide angle end.

7. A zoom lens according to claim 1, wherein during zooming, the first positive lens unit and the second positive lens unit move in such a way that a distance between the first positive lens unit and the second positive lens unit on the optical axis is smaller at the telephoto end than at the wide angle end.

8. A zoom lens according to claim 1, wherein a combined focal length of a lens system on the object side of the second positive lens unit at the wide angle end is negative.

9. A zoom lens according to claim 1, wherein the zoom lens satisfies the following condition:

$$2.0<fp1/fw<40.0,$$

where fp1 is a focal length of the first positive lens unit.

10. A zoom lens according to claim 1, wherein the zoom lens satisfies the following condition:

$$1.1<|\beta p1w|,$$

where βp1w is a lateral magnification of the first positive lens unit in a state in which the zoom lens is focused at infinity at the wide angle end.

11. A zoom lens according to claim 1, wherein the zoom lens satisfies the following conditions:

$$-4.0<ff1/fw<-0.5, \text{ and}$$

$$-6.0<ff2/fw<-0.5,$$

where ff1 is a focal length of the front lens group at the wide angle end, ff2 is the combined focal length of the front lens group, the first positive lens unit and the second positive lens unit at the wide angle end.

12. A zoom lens according to claim 1, wherein the zoom lens consists of a first lens unit having a positive refractive power, a second lens unit having a negative refractive power, a third lens unit having a positive refractive power, a fourth lens unit having a positive refractive power, a fifth lens unit having a positive refractive power, a sixth lens unit having a negative refractive power, and a seventh lens unit having a positive refractive power, which are arranged in order from the object side to the image side, wherein the lens units move during zooming, the third lens unit is the first positive lens unit, the fourth lens unit is the second positive lens unit, and the fifth lens unit is the third positive lens unit.

13. A zoom lens according to claim 1, wherein the zoom lens consists of a first lens unit having a negative refractive power, a second lens unit having a positive refractive power, a third lens unit having a positive refractive power, a fourth lens unit having a positive refractive power, a fifth lens unit having a negative refractive power, and a sixth lens unit having a positive refractive power, which are arranged in order from the object side to the image side, wherein the lens units move during zooming, the second lens unit is the first positive lens unit, the third lens unit is the second positive lens unit, and the fourth lens unit is the third positive lens unit.

14. An image pickup apparatus comprising:
a zoom lens, and
an image sensor configured to receive an image formed by the zoom lens,
wherein the zoom lens comprises a first positive lens unit having a positive refractive power, a second positive lens unit having a positive refractive power arranged adjacent to the first positive lens unit on its image side, and a lens unit having a positive refractive power arranged adjacent to the second positive lens unit on its image side, the distances between the adjacent lens units varying during at least one of zooming and focusing,
wherein the zoom lens includes a front lens group including at least one lens unit provided on the object side of the first positive lens unit, the combined focal length of the front lens group at the wide angle end is negative, the second positive lens unit moves along the optical axis toward the image side during focusing from infinity to a short distance, and the zoom lens satisfies the following conditions:

$$1.5<fp2/fw<10.0 \text{ and}$$

$$1.0<|\beta p2w|,$$

where fp2 is a focal length of the second positive lens unit, fw is a focal length of the zoom lens at the wide angle end, and βp2w is a lateral magnification of the second positive lens unit in a state in which the zoom lens is focused at infinity at the wide angle end.

* * * * *